United States Patent
Yokochi et al.

(10) Patent No.: US 12,105,339 B2
(45) Date of Patent: Oct. 1, 2024

(54) WIRING MODULE, FRAME BODY FOR WIRING MODULE, AND FORMING METHOD FOR FORMING WIRING MODULE

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Takayuki Yokochi, Osaka (JP); Kenichiro Otsuka, Osaka (JP); Takayuki Shimazu, Osaka (JP); Junji Fukui, Yokohama (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 175 days.

(21) Appl. No.: 17/631,835

(22) PCT Filed: Jun. 4, 2021

(86) PCT No.: PCT/JP2021/021451
§ 371 (c)(1),
(2) Date: Jan. 31, 2022

(87) PCT Pub. No.: WO2022/254724
PCT Pub. Date: Dec. 8, 2022

(65) Prior Publication Data
US 2023/0358986 A1 Nov. 9, 2023

(51) Int. Cl.
*G02B 6/44* (2006.01)

(52) U.S. Cl.
CPC .......... *G02B 6/4457* (2013.01); *G02B 6/4452* (2013.01); *G02B 6/4454* (2013.01)

(58) Field of Classification Search
CPC .. G02B 6/4457; G02B 6/4452; G02B 6/3897; G02B 6/4446; G02B 6/4441
See application file for complete search history.

(56) References Cited

U.S. PATENT DOCUMENTS

| 4,798,432 A | * | 1/1989 | Becker | G02B 6/4455 385/135 |
| 5,544,273 A | * | 8/1996 | Harrison | G02B 6/4453 385/134 |

(Continued)

FOREIGN PATENT DOCUMENTS

| EP | 2264502 A1 | 12/2010 |
| JP | H05-010773 A | 1/1993 |

(Continued)

*Primary Examiner* — Ryan A Lepisto
*Assistant Examiner* — Erin D Chiem
(74) *Attorney, Agent, or Firm* — Oliff PLC

(57) ABSTRACT

A wiring module includes: a bottom plate; a module having two surfaces facing each other; a plurality of optical fibers, each of which is connected to the module via at least one of the surfaces of the module; and a plurality of reels which are sequentially stacked on an upper surface of the bottom plate, each of the plurality of reels accommodating a bundle of one corresponding optical fiber among the plurality of optical fibers. The module is disposed in a space formed inside the plurality of reels which are stacked.

17 Claims, 24 Drawing Sheets

(56) References Cited

U.S. PATENT DOCUMENTS

| | | | |
|---|---|---|---|
| 5,545,892 A | 8/1996 | Bilinski et al. | |
| 5,703,990 A * | 12/1997 | Robertson | H01S 3/06704 359/341.1 |
| 6,215,582 B1 * | 4/2001 | Sudo | G02B 6/12002 385/137 |
| 6,215,938 B1 * | 4/2001 | Reitmeier | G02B 6/4441 385/134 |
| 6,511,010 B1 * | 1/2003 | Cooper | G02B 6/4457 242/608.8 |
| 7,171,100 B2 * | 1/2007 | Solheid | G02B 6/44526 385/134 |
| 7,874,411 B2 | 1/2011 | Roberts et al. | |
| 8,074,916 B2 * | 12/2011 | Penumatcha | G02B 6/4457 242/604 |
| 2008/0152294 A1 * | 6/2008 | Hirano | G02B 6/4457 385/135 |
| 2009/0074371 A1 * | 3/2009 | Bayazit | G02B 6/4471 385/135 |
| 2009/0230228 A1 * | 9/2009 | Penumatcha | G02B 6/4457 242/603 |
| 2010/0111486 A1 * | 5/2010 | Hayashi | G02B 6/4457 385/137 |
| 2012/0230643 A1 | 9/2012 | Izuhara | |
| 2014/0161411 A1 * | 6/2014 | Slater | G02B 6/4457 242/598.6 |
| 2015/0043882 A1 * | 2/2015 | Schomisch | G02B 6/4457 29/428 |
| 2017/0313544 A1 * | 11/2017 | Parke | B65H 57/18 |

FOREIGN PATENT DOCUMENTS

| | | | | |
|---|---|---|---|---|
| JP | H05196822 A | * | 8/1993 | G02B 6/4457 |
| JP | H07-091968 A | | 4/1995 | |
| JP | H08-105749 A | | 4/1996 | |
| JP | 2005181867 A | * | 7/2005 | |
| JP | 2012-189642 A | | 10/2012 | |
| WO | WO-2018101222 A1 | * | 6/2018 | G02B 6/3897 |
| WO | 2020/011334 A1 | | 1/2020 | |

* cited by examiner

WIRING MODULE, FRAME BODY FOR WIRING MODULE, AND FORMING METHOD FOR FORMING WIRING MODULE

TECHNICAL FIELD

The present disclosure relates to a wiring module, a frame for a wiring module, and a forming method for forming a wiring module.

BACKGROUND ART

Patent Document 1 discloses a reel including a drum and a flange. A cable is wound around the drum, and a multi-port connection terminal is connected to one end of the cable. The multi-port connection terminal is disposed inside the drum.

CITATION LIST

Patent Literature

Patent Document 1: U.S. Pat. No. 7,874,411

SUMMARY OF INVENTION

A wiring module according to the present disclosure includes:
- a bottom plate;
- a module having two surfaces facing each other;
- a plurality of optical fibers, each of which is connected to the module via at least one of the surfaces of the module; and
- a plurality of reels which are sequentially stacked on an upper surface of the bottom plate, each of the plurality of reels accommodating a bundle of one corresponding optical fiber among the plurality of optical fibers, in which the module is disposed in a space formed inside the plurality of reels which are stacked.

A frame body for a wiring module according to the present disclosure includes:
- a bottom plate;
- a plurality of reels which are sequentially stacked on an upper surface of the bottom plate, each of the plurality of reels being capable of accommodating an optical fiber; and
- a buffer material on which a module is to be placed, in which
- the buffer material is disposed in a space formed inside the plurality of reels which are stacked.

A forming method for forming a wiring module according to the present disclosure is a forming method for forming a wiring module including a bottom plate, a buffer material, a module having two surfaces facing each other, a plurality of optical fibers, and a plurality of reels, the forming method including:
- a step of disposing the buffer material on an upper surface of the bottom plate and disposing the module on the buffer material;
- an optical fiber bundle forming step of forming one optical fiber of the plurality of optical fibers into a bundle;
- an optical fiber bundle accommodating step of accommodating the bundle of the optical fiber in one reel of the plurality of reels; and
- a reel disposition step of stacking the one reel of the plurality of reels on the upper surface of the bottom plate such that the module is disposed inside the reel, in which
- the optical fiber bundle forming step, the optical fiber bundle accommodating step, and the reel disposition step are repeatedly performed until all of the plurality of reels are stacked, and
- in the reel disposition step performed for a second time and thereafter, the reel is disposed so as to be stacked on another reel that is already stacked on the upper surface of the bottom plate.

DESCRIPTION OF EMBODIMENTS

Figure 1:
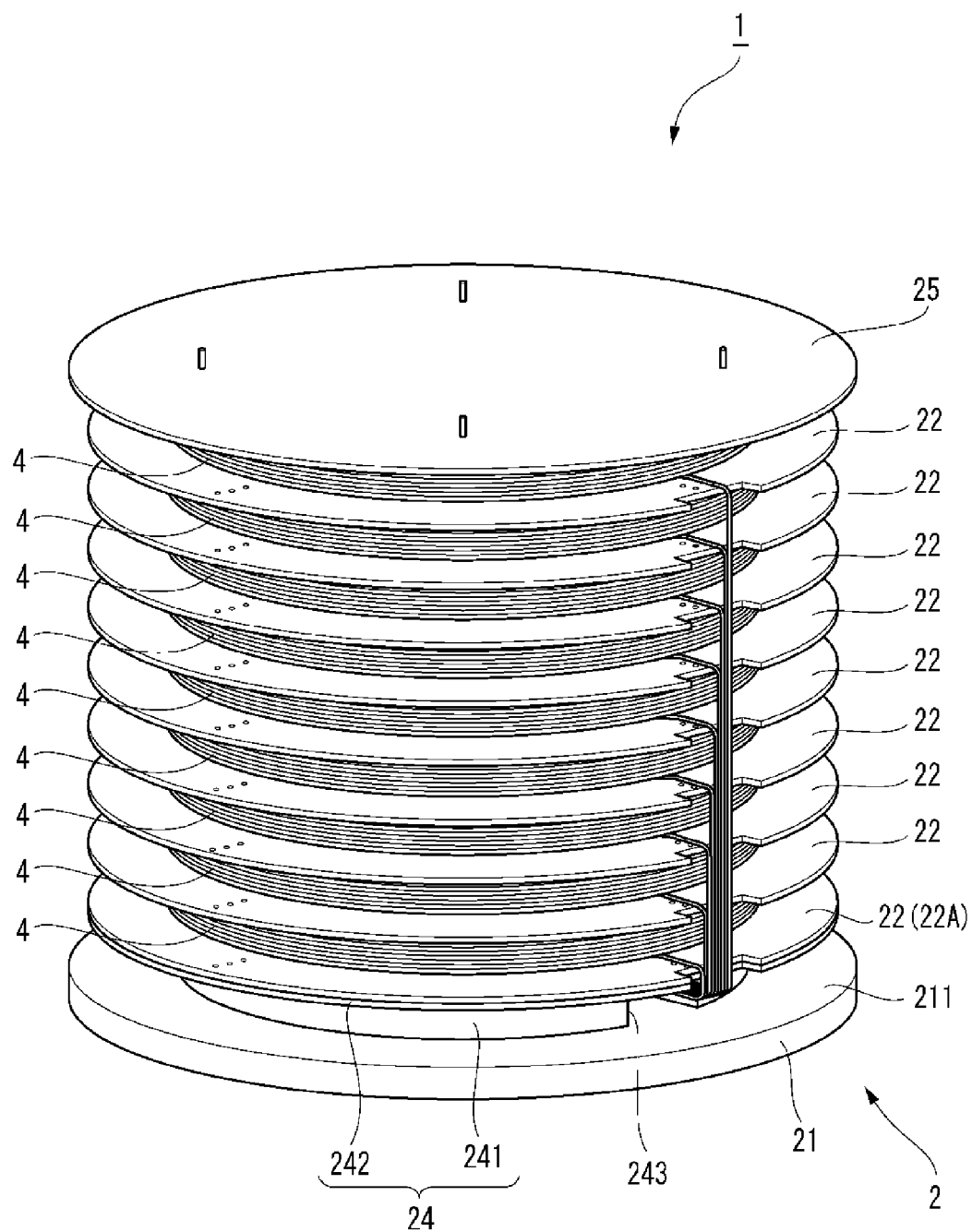
FIG. 1 is a perspective view of a wiring module according to an embodiment of the present disclosure.

Problems to be Solved by Present Disclosure

An object of the present disclosure is to improve connection workability in a case where a module is connected to another device using a plurality of optical fibers.

Effects of Present Disclosure

According to the present disclosure, the present disclosure can improve the connection workability in the case where the module is connected to the other device using the plurality of optical fibers.

Description of Embodiments of Present Disclosure

First, contents of embodiments of the present disclosure will be listed and described.

(1) A wiring module according to an aspect of the present disclosure includes:
 a bottom plate;
 a module having two surfaces facing each other;
 a plurality of optical fibers, each of which is connected to the module via at least one of the surfaces of the module; and
 a plurality of reels which are sequentially stacked on an upper surface of the bottom plate, each of the plurality of reels accommodating a bundle of one corresponding optical fiber among the plurality of optical fibers, in which
 the module is disposed in a space formed inside the plurality of reels which are stacked.

According to the present disclosure, since the optical fibers are connected to the module, when the module is connected to another device, work of connecting the optical fibers to the module is not necessary, and connection work time can be shortened. Further, since the optical fibers are accommodated in the corresponding reels, when the module is connected to the other device, it is possible to prevent the optical fibers from being mixed or intertwined with each other. Further, since the plurality of reels are stacked and the module is disposed in the space inside the reels which are stacked, the module and the plurality of optical fibers connected thereto can be collectively handled as one package. Therefore, it is possible to improve connection workability in a case where the module is connected to the other device using the plurality of optical fibers.

Here, the term "optical fiber" used in the present specification means a linear body including at least one optical fiber core wire, and the form thereof is not limited. For example, the "optical fiber" also includes an optical fiber cord in which a periphery of the one optical fiber core wire is covered with an outer cover or the like. Alternatively, the "optical fiber" may include an aggregate of a plurality of optical fiber core wires connected or not connected to each other. Further, the "optical fiber" may include an optical fiber cord or an optical cable in which a periphery of the aggregate of the plurality of optical fiber core wires is covered with an outer cover or the like. Further, the term "optical fiber core wire" used in the present specification means a configuration in which at least one coating layer is formed on a periphery of a glass fiber.

In addition, an expression "the optical fiber is connected to the module via the surface of the module" used in the present specification may include a form in which the optical fiber is connected to the optical fiber connection portion formed on the surface of the module, a form in which the optical fiber passes through the surface of the module and is directly connected to an inner surface of the module, and a form in which the optical fiber passes through the surface of the module and is directly connected to another optical fiber or device disposed inside the module.

In addition, an expression "the reel is stacked on the upper surface of the bottom plate" used in the present specification is not limited to a form in which the reel is directly provided on the upper surface of the bottom plate, and also includes a form in which another member is interposed between the reel and the upper surface of the bottom plate.

(2) The reel may include a body portion extending in a stacking direction of the plurality of reels, and a flange portion formed at a position close to one end of the body portion in an extending direction of the body portion and extending toward an outer side of the body portion in a direction intersecting the extending direction.

According to the present disclosure, the bundle of the optical fiber accommodated in the reel can be easily taken out from another end of the body portion in the extending direction of the body portion in which the flange portion is not formed.

(3) A notch may be provided in the flange portion of the reel.

According to the present disclosure, when the optical fiber is wired via the outer side of the reel, it is possible to prevent the optical fiber from protruding to the outer side of the reel.

(4) The wiring module may further include:
 a plurality of pillars extending in the stacking direction of the plurality of reels and spaced apart from each other in a direction intersecting the stacking direction, in which a plurality of holes may be formed in the body portion of the reel, a corresponding pillar being inserted into each of the plurality of holes.

According to the present disclosure, the reel can be easily positioned when the plurality of reels are stacked, and the reel can be prevented from moving in the direction intersecting the stacking direction.

(5) The wiring module may further include:
 a spacer disposed between the bottom plate and a reel closest to the bottom plate of the plurality of reels, in which
 an opening region communicating with the space may be formed between the bottom plate and the reel closest to the bottom plate of the plurality of reels.

According to the present disclosure, the optical fiber accommodated in the reel can be wired via the outer side of the reel to the space inside the reel on which the module is disposed.

(6) At least one surface of the surfaces of the module facing each other may include an optical fiber connecting portion.

According to the present disclosure, the module can be connected to the optical fiber accommodated in the reel via the optical fiber connection portion provided on the one surface.

(7) Both of the two surfaces of the module facing each other may include the optical fiber connecting portion.

According to the present disclosure, the module can be connected to the optical fiber accommodated in the reel via the optical fiber connection portion provided on the one surface. In addition, the module can be connected to another optical fiber via the optical fiber connecting portion provided on the other surface.

(8) A winding diameter of the bundle of the optical fiber may be larger than a diameter of the body portion of the reel.

According to the present disclosure, since the diameter of the bundle of the optical fiber is larger than the diameter of the body portion of the reel, the bundle of the optical fiber can be easily taken out from the reel. Therefore, wiring work of the optical fiber is improved.

(9) The optical fiber may be accommodated in a periphery of the body portion of the reel in a state of a bundle in which the optical fiber wound in a shape of 8 is folded back.

According to the present disclosure, it is possible to prevent the optical fiber from being twisted when the bundle of the optical fiber is taken out from the reel and the optical fiber is wired. Therefore, the wiring work of the optical fiber is improved.

(10) The optical fiber may be accommodated in a periphery of the body portion of the reel in a state of a bundle in which the optical fiber is wound by reversed phase winding.

According to the present disclosure, it is possible to prevent the optical fiber from being twisted when the bundle of the optical fiber is taken out from the reel and the optical fiber is wired. Therefore, the wiring work of the optical fiber is improved.

(11) The wiring module may further include:
a buffer material on which the module is placed, in which the buffer material may be disposed in the space formed inside the plurality of reels which are stacked.

According to the present disclosure, it is possible to mitigate an impact applied to the module from the outside by the buffer material.

(12) The buffer material may include a plurality of concave portions or convex portions that are fitted to a part of the body portion of the reel.

According to the present disclosure, since the part of the body portion of the reel is fitted into the concave portions or the convex portions of the buffer material, it is possible to prevent the buffer material from moving in the direction intersecting the stacking direction of the reel.

(13) A frame body for a wiring module according to an aspect of the present disclosure includes:
a bottom plate;
a plurality of reels which are sequentially stacked on an upper surface of the bottom plate, each of the plurality of reels being capable of accommodating an optical fiber; and
a buffer material on which a module is to be placed, in which the buffer material is disposed in a space formed inside the plurality of reels which are stacked.

According to the present disclosure, the module can be disposed in the space inside the plurality of reels which are stacked, and the plurality of optical fibers can be accommodated in the plurality of reels, respectively. Accordingly, the module and the plurality of optical fibers can be collectively handled as one package. In addition, when the module is connected to another device, it is possible to prevent the optical fibers from being mixed or intertwined with each other. In addition, since the module is placed on the buffer material, it is possible to mitigate the impact applied to the module from the outside. Therefore, it is possible to improve the connection workability in the case where the module is connected to the other device using the plurality of optical fibers.

(14) The reel may include a body portion extending in a stacking direction of the plurality of reels, and a flange portion formed at a position close to one end of the body portion in an extending direction of the body portion and extending toward an outer side of the body portion in a direction intersecting the extending direction.

According to the present disclosure, the bundle of the optical fiber accommodated in the reel can be easily taken out from the other end of the body portion in the extending direction of the body portion in which the flange portion is not formed.

(15) A notch may be provided in the flange portion of the reel.

According to the present disclosure, when the optical fiber is wired via the outer side of the reel, it is possible to prevent the optical fiber from protruding to the outer side of the reel.

(16) The frame body for a wiring module may further include:
a plurality of pillars extending in the stacking direction of the plurality of reels and spaced apart from each other in a direction intersecting the stacking direction, in which
a plurality of holes may be formed in the body portion of the reel, a corresponding pillar being inserted into each of the plurality of holes.

According to the present disclosure, the reel can be easily positioned when the plurality of reels are stacked, and the reel can be prevented from moving in the direction intersecting the stacking direction.

(17) The frame body for a wiring module may further include:
a spacer disposed between the bottom plate and a reel closest to the bottom plate of the plurality of reels, in which
an opening region communicating with the space may be formed between the bottom plate and the reel closest to the bottom plate of the plurality of reels.

According to the present disclosure, the optical fiber accommodated in the reel can be wired via the outer side of the reel to the space inside the reel on which the module is disposed.

(18) The buffer material may include a plurality of concave portions or convex portions that are fitted to a part of the body portion of the reel.

According to the present disclosure, since the part of the body portion of the reel is fitted into the concave portions or the convex portions of the buffer material, it is possible to prevent the buffer material from moving in the direction intersecting the stacking direction of the reel.

(19) A forming method for forming a wiring module according to an aspect of the present disclosure is a forming method for forming a wiring module including a bottom plate, a buffer material, a module having two surfaces facing each other, a plurality of optical fibers, and a plurality of reels, the forming method including:
a step of disposing the buffer material on an upper surface of the bottom plate and disposing the module on the buffer material;
an optical fiber bundle forming step of forming one optical fiber of the plurality of optical fibers into a bundle;
an optical fiber bundle accommodating step of accommodating the bundle of the optical fiber in one reel of the plurality of reels; and
a reel disposition step of stacking the one reel of the plurality of reels on the upper surface of the bottom plate such that the module is disposed inside the reel, in which
the optical fiber bundle forming step, the optical fiber bundle accommodating step, and the reel disposition step are repeatedly performed until all of the plurality of reels are stacked, and
in the reel disposition step performed for a second time and thereafter, the reel is disposed so as to be stacked on another reel that is already stacked on the upper surface of the bottom plate.

According to the present disclosure, since the optical fibers are accommodated in the corresponding reels, respectively, when the module is connected to another device, it is possible to prevent the optical fibers from being mixed or intertwined with each other. Further, since the plurality of reels are stacked and the module is disposed in the space inside the reels which are stacked, the module and the plurality of optical fibers can be collectively handled as one package. In addition, since the module is placed on the buffer material, it is possible to mitigate the impact applied to the module from the outside. Therefore, it is possible to improve the connection workability in the case where the module is connected to the other device using the plurality of optical fibers.

In the present specification, an expression "the buffer material is disposed on the upper surface of the bottom plate" is not limited to the form in which the buffer material is directly disposed on the upper surface of the bottom plate, and also includes a form in which another member is interposed between the buffer material and the upper surface of the bottom plate.

(20) After the optical fiber bundle forming step and the optical fiber bundle accommodating step are performed, in the reel disposition step, the reel in which the bundle of the optical fiber is accommodated may be stacked on the upper surface of the bottom plate.

According to the present disclosure, since the optical fiber is accommodated in the reel before the reel is disposed, accommodating work of the optical fiber in the reel is easy.

(21) The forming method for forming a wiring module may further include:

a connection step of connecting one end of the bundle of the optical fiber to the module via at least one of the surfaces of the module after the reel disposition step is performed.

According to the present disclosure, since the optical fibers are connected to the module, when the module is connected to another device, the work of connecting the optical fibers to the module is not necessary, and the connection work time can be shortened.

Details of Embodiments of Present Disclosure

Hereinafter, embodiments of the present disclosure will be described in detail with reference to the accompanying drawings. The dimensions of the respective members illustrated in the drawings may be different from the actual dimensions of the respective members for the sake of convenience of description. The present disclosure is not limited to these examples but is disclosed by the scope of the claims, and is intended to include all modifications within meanings and scopes equivalent to the claims.

(Wiring Module)

Figure 2:
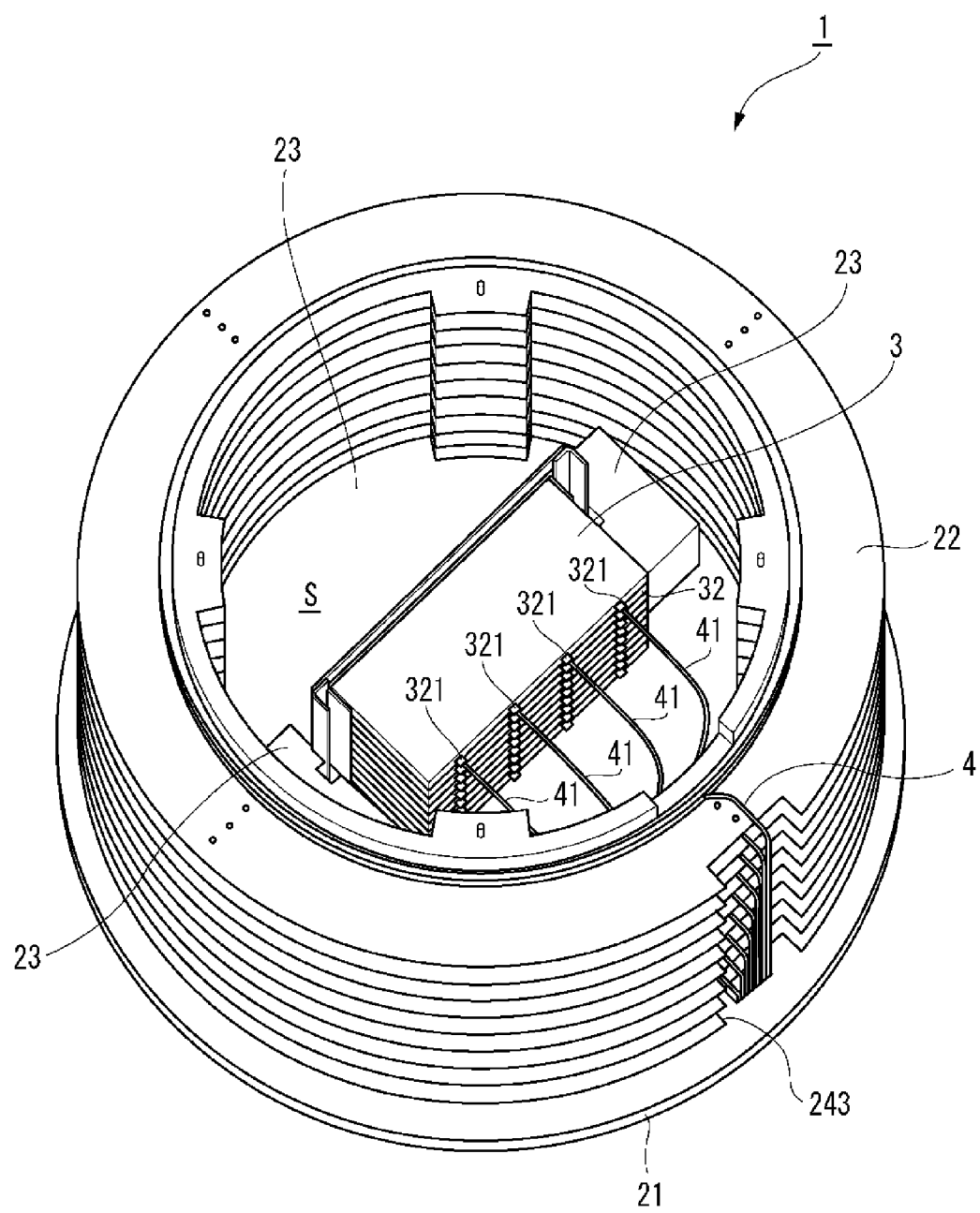
FIG. 2 is a perspective view showing a state in which an upper lid is removed from the wiring module of FIG. 1.
Figure 3:
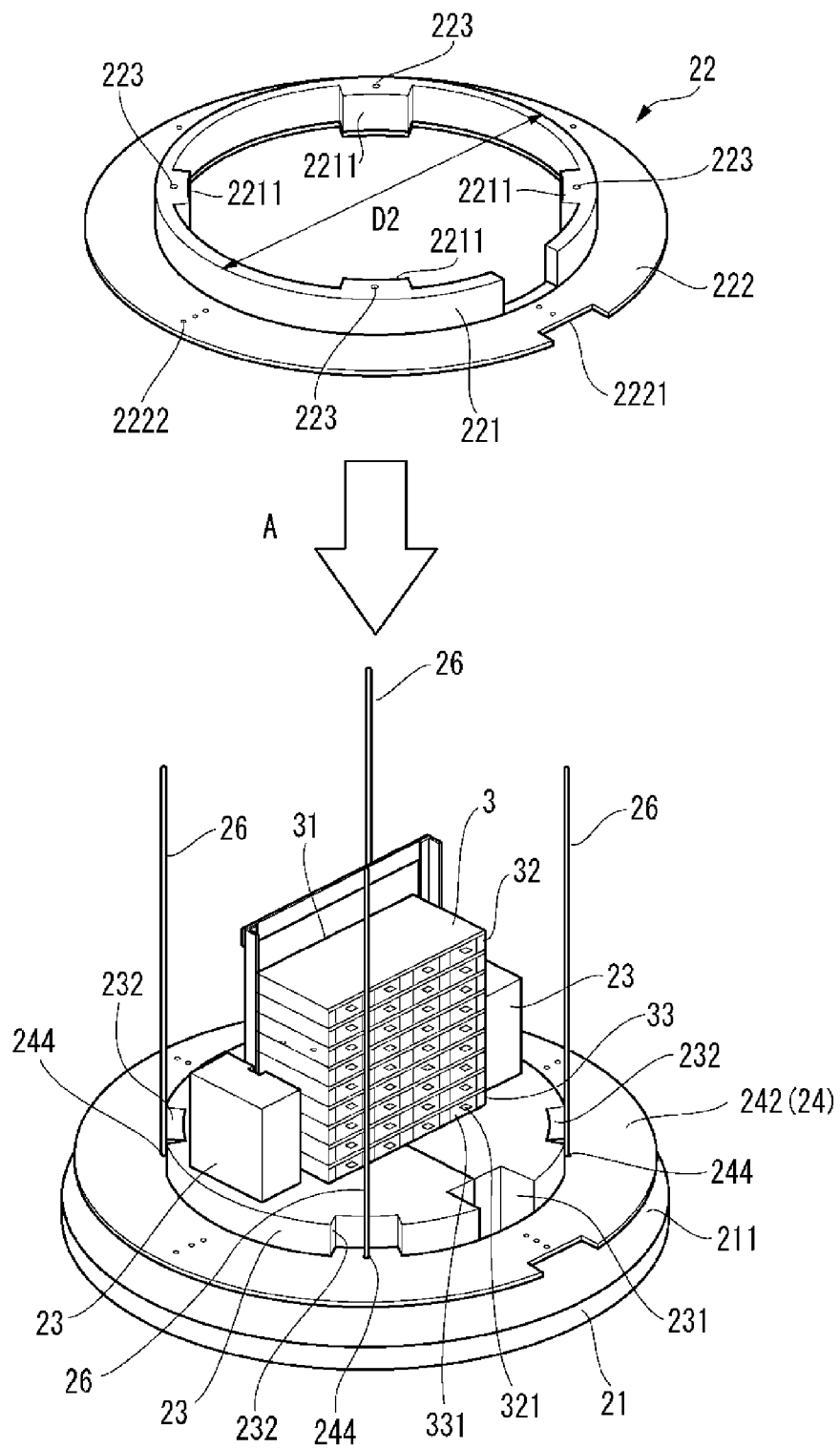
FIG. 3 is a partial exploded view of the wiring module of FIG. 1.

FIG. 1 is a perspective view of a wiring module 1 according to the embodiment of the present disclosure. FIG. 2 is a perspective view showing a state in which an upper lid is removed from the wiring module 1 of FIG. 1. FIG. 3 is a partial exploded view of the wiring module 1 of FIG. 1.

As shown in FIGS. 1 and 2, the wiring module 1 includes a frame body 2, a module 3, and a plurality of optical cables 4. The optical cable 4 is an example of the optical fiber. The optical cable 4 includes, for example, the plurality of optical fiber core wires in which at least one coating layer is formed on the periphery of the glass fiber, and the outer cover covering the periphery thereof.

The frame body 2 includes a bottom plate 21, a plurality of reels 22, a buffer material 23, a spacer 24, and an upper lid 25. The bottom plate 21 has an upper surface 211 on which the module 3 and the plurality of reels 22 are disposed. The bottom plate 21 is formed of, for example, a plywood plate.

The plurality of reels 22 are sequentially stacked on the upper surface 211 of the bottom plate 21. Each reel 22 is configured to be capable of accommodating the optical cable 4. In this example, nine reels 22 are stacked on the upper surface 211 of the bottom plate 21. The upper lid 25 is disposed on the stacked reels 22.

As shown in FIG. 3, the reel 22 includes a body portion 221 and a flange portion 222. The body portion 221 extends in a stacking direction A of the plurality of reels 22. In this example, the body portion 221 has a C shape when viewed from the stacking direction A of the reels 22. The flange portion 222 is formed at one end of the body portion 221 in the extending direction of the body portion 221. The flange portion 222 is adhered to the one end of the body portion 221. The flange portion 222 extends toward the outer side of the body portion 221 in a direction orthogonal to the extending direction of the body portion 221. In this example, the flange portion 222 has a ring shape when viewed from the stacking direction of the reels 22. The direction orthogonal to the extending direction of the body portion 221 is an example of the direction intersecting the extending direction of the body portion 221. The body portion 221 is formed of, for example, foamed styrol. The flange portion 222 is formed of, for example, cardboard.

As shown in FIGS. 2 and 3, the buffer material 23 is disposed in a space S formed inside the plurality of stacked reels 22. The module 3 is placed on the buffer material 23. In this example, the buffer material 23 is disposed on the upper surface 211 of the bottom plate 21 in a state of being in contact with the upper surface 211 of the bottom plate 21. The buffer material 23 may be also disposed on side surfaces of the module 3.

As shown in FIG. 1, the spacer 24 is disposed between the bottom plate 21 and a reel 22A closest to the bottom plate 21 of the plurality of reels 22. In this example, the spacer 24 has the same shape as the reels 22, and is disposed on the bottom plate 21 in a direction vertically opposite to the reels 22. That is, a body portion 241 of the spacer 24 is disposed on the upper surface 211 of the bottom plate 21 in the state of being in contact with the upper surface 211 of the bottom plate 21. The plurality of reels 22 are stacked on a flange portion 242 of the spacer 24.

An opening region 243 communicating with the space S is formed between the bottom plate 21 and the reel 22A closest to the bottom plate 21. In this example, the opening region 243 is formed by the body portion 241 and the flange portion 242 of the spacer 24 and the bottom plate 21.

The module 3 is disposed in the space S formed inside the plurality of stacked reels 22. As shown in FIG. 3, the module 3 includes a front surface 31 and a rear surface 32 facing each other. The module 3 includes a plurality of optical fiber connecting portions 311 on the front surface 31, and a plurality of optical fiber connecting portions 321 on the rear surface 32 (see FIG. 4).

Figure 4:
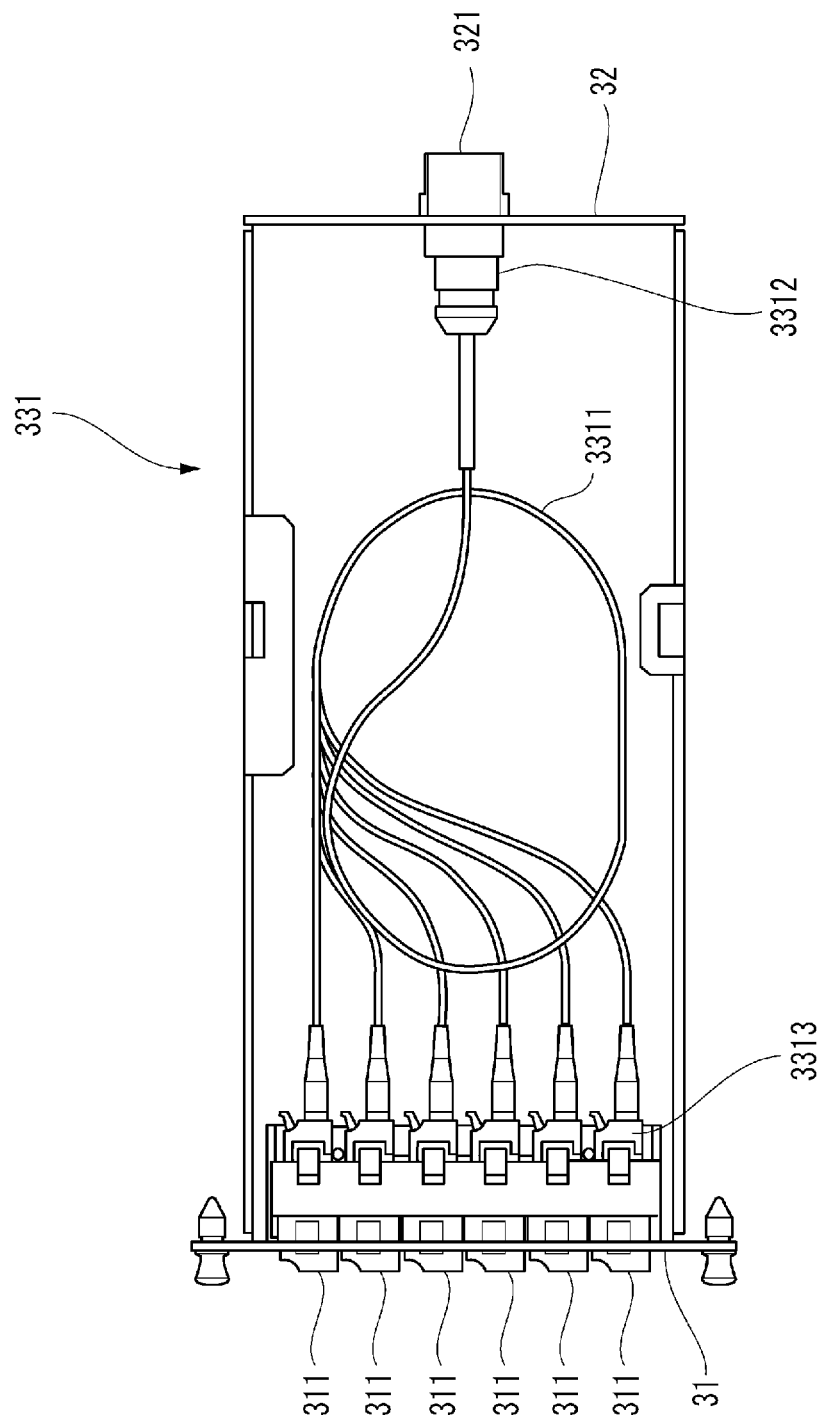
FIG. 4 is a diagram showing an internal configuration of a module of FIG. 1.

For example, the module 3 includes a plurality of (nine in this example) device modules 33 stacked in a vertical direction, and each of the device modules 33 includes a plurality of (four in this example) branch boxes 331 arranged in a left-right direction. For example, as shown in FIG. 4, a wiring cord 3311 is disposed inside the branch box 331. One end of the wiring cord 3311 is connected to the optical fiber connecting portion 321 provided on the rear surface 32 of the branching box 331, and another end of the wiring cord 3311 is connected to the optical fiber connecting portions 311 provided on the front surface 31 of the branching box 331. For example, the optical fiber connection portion 311 is a single-core adapter (for example, an LC adapter), and the optical fiber connection portion 321 is a multi-core adapter (for example, an MPC adapter). In this example, the wiring cord 3311 includes six optical fiber core wires. At one end of the wiring cord 3311, the six optical fiber core wires are integrated and connected to the optical fiber connection portion 321 via a multi-core connector 3312, and at the other end of the wiring cord 3311, each of the six optical fiber core wires is connected to the corresponding optical fiber connection portion 311 via the single core connector 3313.

Figure 5:
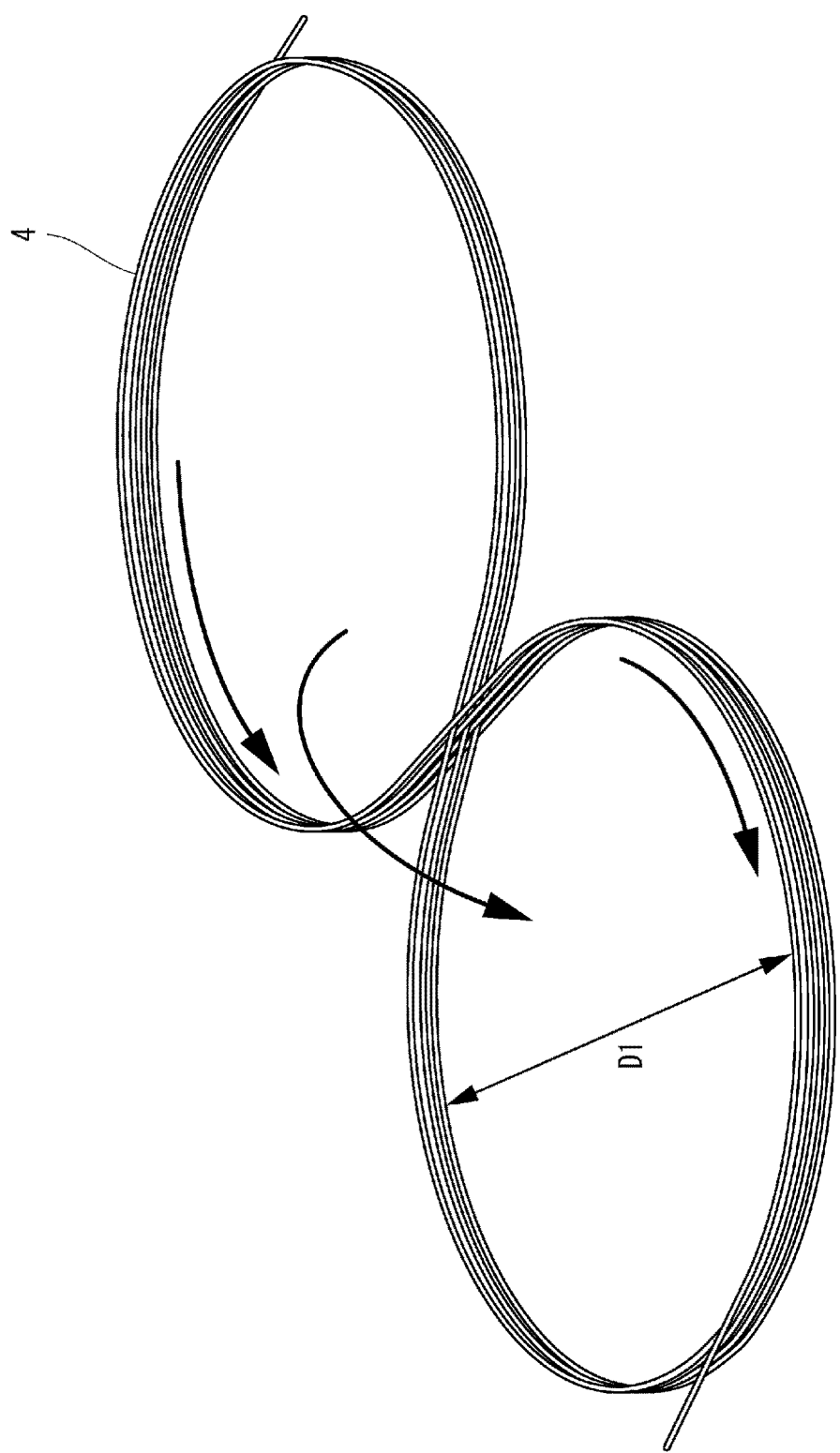
FIG. 5 is a diagram showing a method for creating a bundle of an optical cable of FIG. 1.

Returning to FIG. 1, each of the plurality of optical cables 4 is accommodated in the corresponding reel 22 in a state of a bundle. For example, as shown in FIG. 5, the optical cable 4 is accommodated in the periphery of the body portion 221 of the reel 22 in a state of a bundle in which the optical cable 4 wound in a shape of 8 is folded back. The bundle of the optical cable 4 is formed such that a winding diameter D1 of the bundle of the optical cable 4 is larger than a diameter D2 (see FIG. 3) of the body portion 221 of the reel 22.

One end of the optical cable 4 extending from the reel 22 is connected to the optical fiber connecting portion 321 provided on the rear surface 32, as shown in FIG. 2. Specifically, the one end of the optical cable 4 extending from the bundle of the optical cable 4 accommodated in the reel 22 passes through the outside of the reel 22, is inserted through the opening region 243, and is wired to the space S inside the stacked reels 22. In FIG. 2, a plurality of branch cables 41 branched from the one optical cable 4 wired in the space S are shown, and the other optical cables 4 are omitted.

In this example, the one end of the optical cable 4 is branched into four branch cables 41. The branch cables 41 are connected to four optical fiber connecting portions 321 (for example, MPO adapters) provided on the rear surface 32 of the module 3 in a state in which the multi-core connector (for example, MPO connector) is attached. The other end of the optical cable 4 is accommodated in the reel 22 as a part of the bundle of the optical cable 4 in a state in which a connector (see FIG. 16) is attached to a tip end.

As described above, according to the wiring module 1 and the frame body 2 used in the wiring module 1 of the present disclosure, the module 3 can be arranged in the space S inside the plurality of stacked reels 22, and the plurality of optical cables 4 can be accommodated in the plurality of reels 22, respectively. As a result, the module 3 and the plurality of optical cables 4 can be collectively handled as one package. In addition, when the module 3 is connected to the other device, it is possible to prevent the optical cables 4 from being mixed or intertwined with each other. Therefore, it is possible to improve the connection workability in the case where the module 3 is connected to the other device using the plurality of cables 4.

Further, since the optical cable 4 is connected to the module 3 in advance, when the module 3 is connected to the other device, the work of connecting the optical cable 4 to the module 3 is not necessary, and the connection work time can be shortened.

In addition, since the module 3 is placed on the buffer material 23, it is possible to mitigate the impact applied to the module 3 from the outside.

Further, since the flange portion 222 of the reel 22 is formed at one end of the body portion 221 in the extending direction of the body portion 221, the bundle of the optical cable 4 accommodated in the reel 22 can be easily taken out from the other end of the body portion 221 in the extending direction where the flange portion 222 is not formed.

Further, since the module 3 includes the optical fiber connecting portions 321 on the rear surface 32, the module 3 can be connected to the optical cable 4 accommodated in the reel 22 via the optical fiber connecting portions 321. Further, since the module 3 includes the optical fiber connecting portions 311 on the front surface 31, the module 3 can be connected to other optical cables via the optical fiber connecting portions 311.

Further, since the bundle of the optical cable 4 is formed in the bundle in which the optical cable 4 wound in the shape of 8 is folded back, it is possible to prevent the optical cable 4 from being twisted when the bundle of the optical cable 4 is taken out from the reel 22 and the optical cable 4 is wired. Therefore, the wiring work of the optical cables 4 is improved.

Further, since the optical cable 4 is formed such that the winding diameter D1 of the bundle of the optical cable 4 is larger than the diameter D2 of the body portion 221 of the reel 22, the bundle of the optical cable 4 can be easily taken out from the reel 22. Therefore, the wiring work of the optical cables 4 is improved.

Further, the spacer 24 is disposed between the bottom plate 21 and the reel 22A closest to the bottom plate 21, and the opening region 243 communicating with the space S is formed between the bottom plate 21 and the reel 22A closest to the bottom plate 21. Accordingly, the optical cable 4 accommodated in the reel 22 can be wired via the outer side of the reel 22 in the space S inside the reel 22 on which the module 3 is disposed.

As shown in FIG. 3, the frame body 2 of the wiring module 1 includes a plurality of pillars 26, and a plurality of holes 223 may be formed in the body portion 221 of the reel 22. The plurality of pillars 26 extend in the stacking direction A of the plurality of reels 22, and are spaced apart from each other in the direction intersecting the stacking direction A. One end of the pillar 26 is fixed to the bottom plate 21, and the upper lid 25 is fixed to the other end of the pillar 26 (see FIG. 1). The plurality of holes 223 are formed at positions corresponding to the plurality of pillars 26, and the pillars 26 are inserted into the holes 223 when the reels 22 are stacked.

In this example, four pillars 26 are disposed at equal intervals in the direction orthogonal to the stacking direction A, and four holes 223 are provided in the body portion 221 of the reel 22. Similarly, a hole (not shown) is also provided in the flange portion 222 of the reel 22. According to such a configuration, the reels 22 can be easily positioned when the plurality of reels 22 are stacked, and the reels 22 can be prevented from moving in the direction intersecting the stacking direction. Here, the number of the pillars 26 and the number of the holes 223 is not limited to four, as long as the number of the holes 223 is plural.

Further, as shown in FIG. 3, a plurality of holes 244 into which the pillars 26 are inserted may be similarly formed in the spacer 24. Also in this case, the spacer 24 can be easily positioned, and the spacer 24 can be prevented from moving in the direction intersecting the stacking direction.

As shown in FIG. 3, a notch 2221 may be provided in the flange portion 222 of the reel 22. Accordingly, as shown in FIG. 1, when the optical cables 4 are wired via the outer side of the reels 22, it is possible to prevent the optical cables 4 from protruding to the outer side of the reels 22.

As shown in FIGS. 2 and 3, the buffer material 23 may be formed so as to be in contact with the inner surface of the body portion 221 of the reel 22. In this case, as shown in FIG. 3, the buffer material 23 may include a concave portion 231 communicating with the opening region 243. Accordingly, the one end of the optical cable 4 extending from the reel 22 passes through the outside of the reel 22, and is wired to the space S inside the stacked reels 22 via the opening region 243 and the concave portion 231.

Further, as shown in FIG. 3, the body portion 221 of the reel 22 may include a plurality of convex portions 2211, and the buffer material 23 may include a plurality of concave portions 232 to be fitted to the convex portions 2211 of the body portion 221 of the reel 22. In this example, four convex portions 2211 are formed by extending a part of the body portion 221 toward an inner side of the body portion 221 in the direction orthogonal to the extending direction of the body portion 221 at four positions of the body portion 221. According to such a configuration, since the convex portions 2211 of the body portion 221 of the reel 22 are fitted into the concave portions 232 of the buffer material 23, it is possible to prevent the buffer material 23 from moving in the direction intersecting the stacking direction A of the reels 22. Here, the number of the convex portions 2211 and the concave portions 232 is not limited to four, as long as the number is at least one.

As shown in FIG. 3, the flange portion 222 of the reel 22 may be provided with a fixing hole 2222 for fixing the bundle of the optical cable 4 to the flange portion 222. For example, the bundle of the optical cable 4 is fixed to the flange portion 222 by a binding band passed through the fixing hole 2222. Accordingly, the bundle of the optical cable 4 can be firmly fixed to the flange portion 222.

(Forming Method for Forming Wiring Module 1)

Next, a forming method for forming the wiring module 1 will be described with reference to FIGS. 6 to 13.

Figure 6:
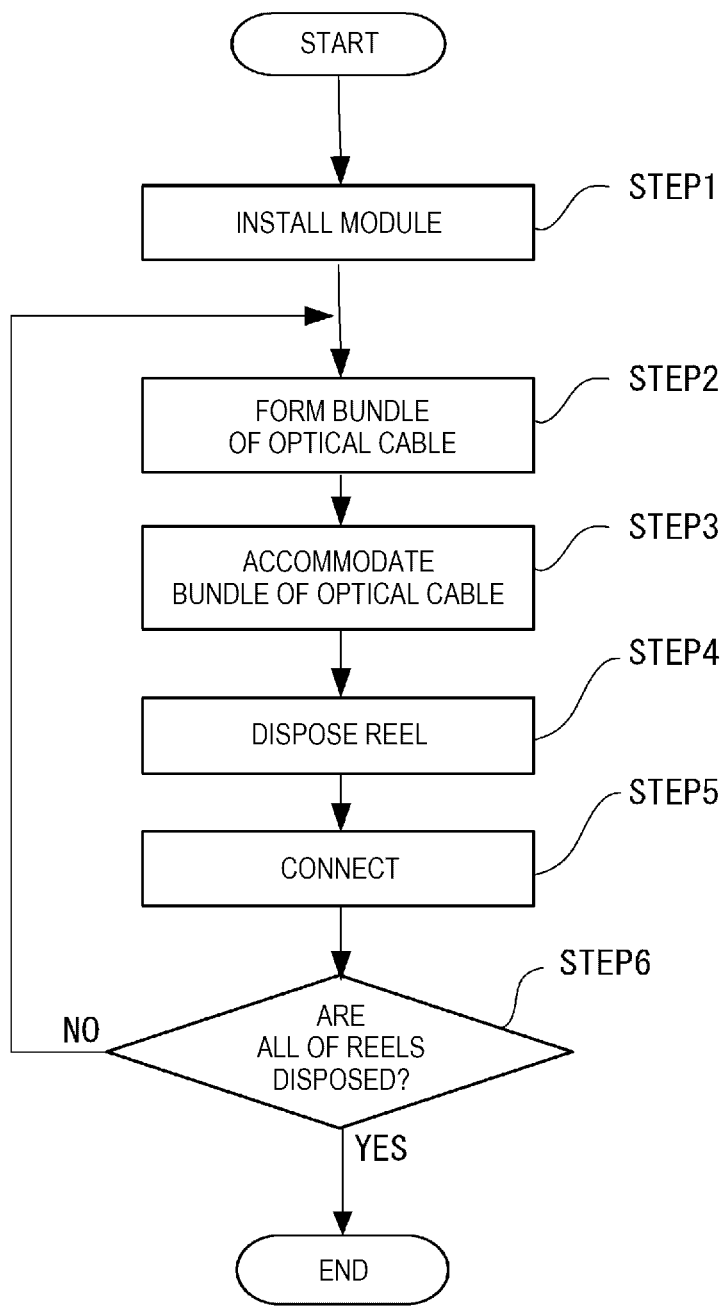
FIG. 6 shows a method for forming a wiring module.
Figure 7:
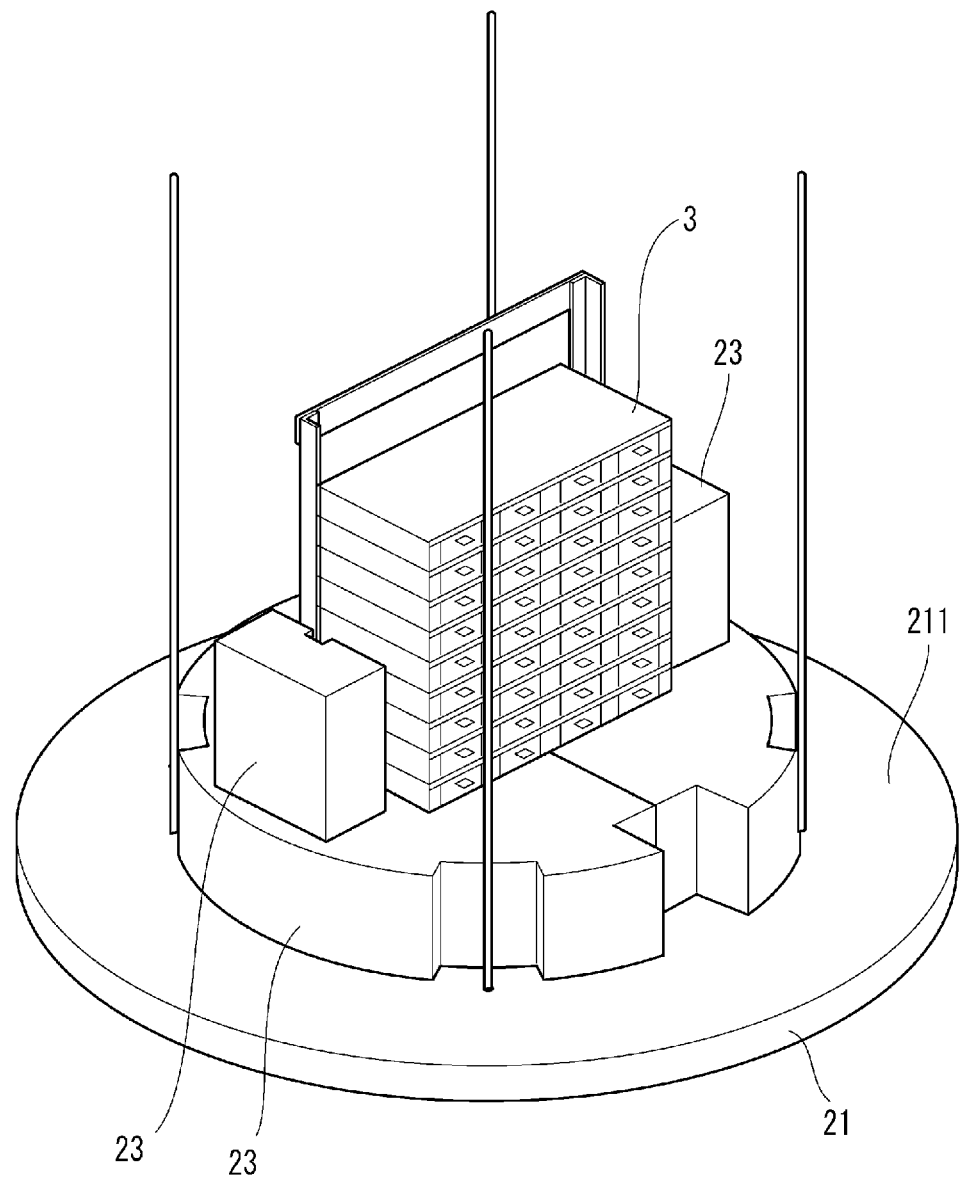
FIG. 7 is a diagram in which the module is disposed on a buffer material.
Figure 8:
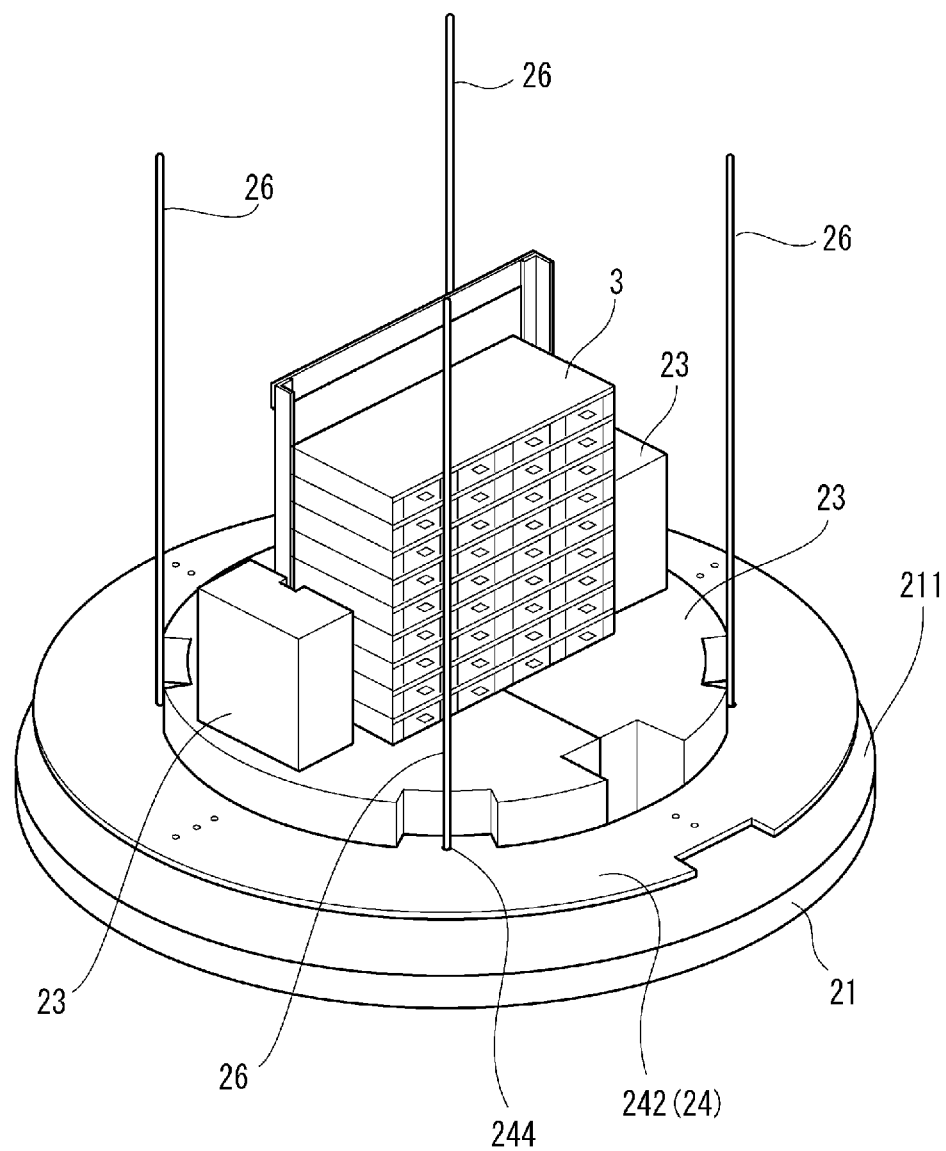
FIG. 8 is a diagram in which a spacer is disposed on a bottom plate.

First, as shown in FIG. 7, the buffer material 23 is disposed on the upper surface 211 of the bottom plate 21, and the module 3 is disposed on the buffer material 23 (STEP 1 in FIG. 6). Further, the buffer materials 23 are also disposed on the side surfaces of the module 3. Then, as shown in FIG. 8, the spacer 24 is disposed on the upper surface 211 of the bottom plate 21. For example, the pillars 26 are inserted into the holes 244 provided in the spacer 24, and the spacer 24 is moved downward along the pillars 26.

Figure 9:
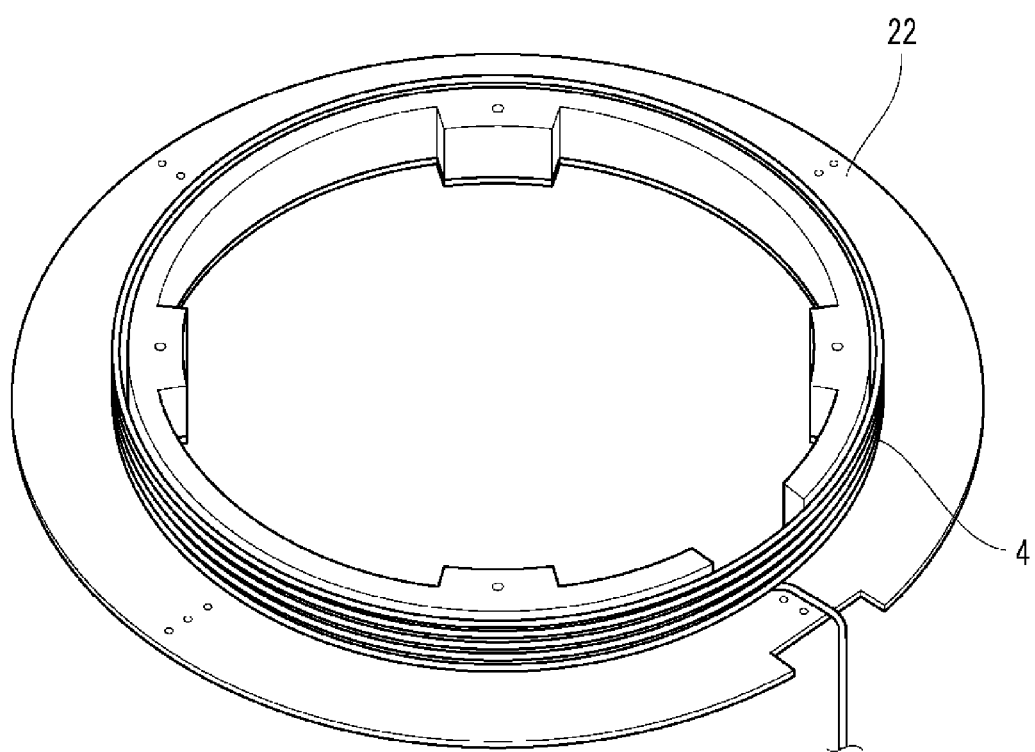
FIG. 9 is a diagram in which the optical cable is accommodated in a reel.

Subsequently, the bundle of the optical cable 4 is formed using one optical cable 4 of the plurality of optical cables 4 (STEP 2 in FIG. 6). For example, as shown in FIG. 5, the bundle of the optical cable 4 is formed in the bundle in which the optical cable 4 wound in the shape of 8 is folded back. Then, as shown in FIG. 9, the bundle of the optical cable 4 is accommodated in the reel 22 (STEP 3 in FIG. 6).

Figure 10:
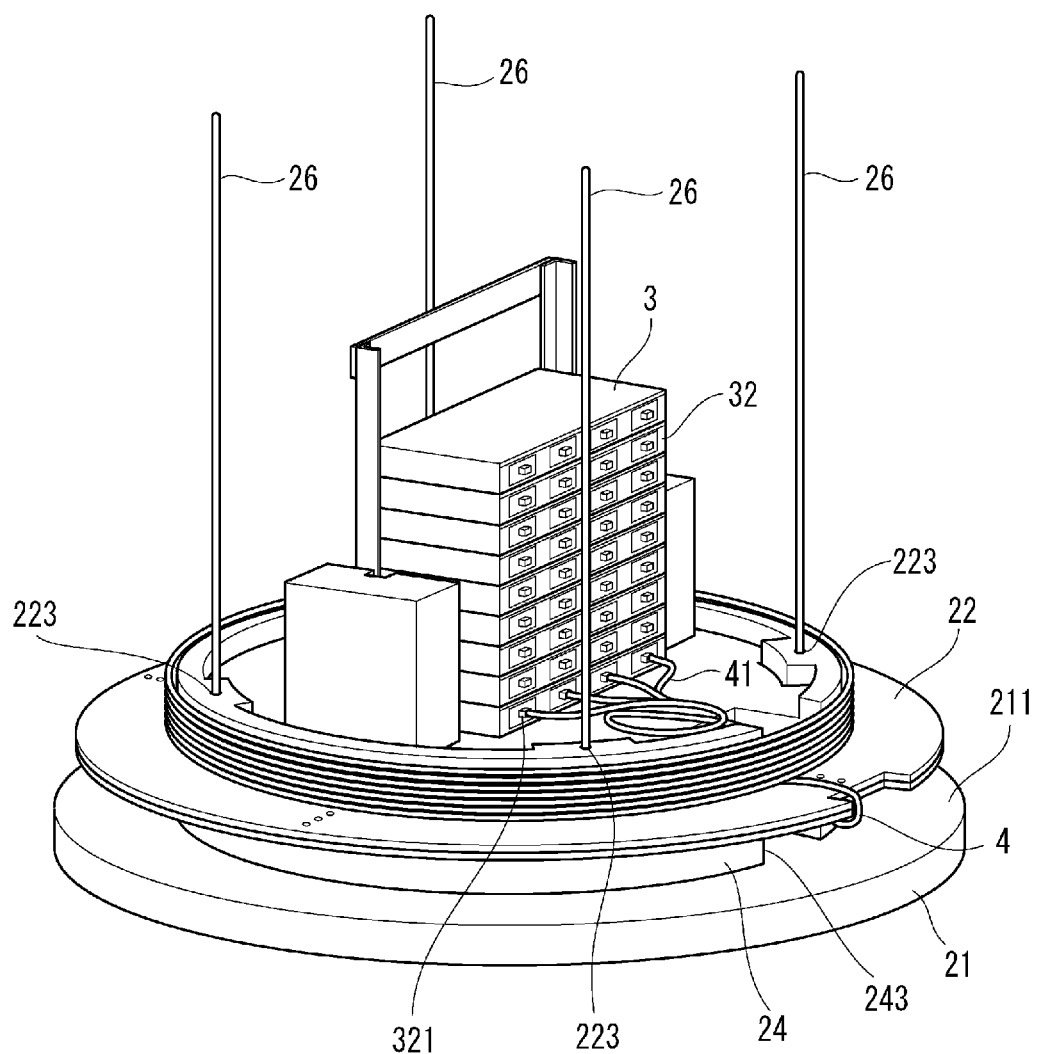
FIG. 10 is a diagram in which the reel is stacked on the bottom plate.

Subsequently, as shown in FIG. 10, the reel 22 in which the bundle of the optical cable 4 is accommodated is stacked on the upper surface 211 of the bottom plate 21 such that the module 3 is disposed inside the reel 22 (STEP 4 in FIG. 6). Specifically, the pillars 26 are inserted into the holes 223 provided in the reel 22, and the reel 22 is moved downward along the pillars 26. The reel 22 is stacked on the upper surface 211 of the bottom plate 21 via the spacer 24.

Figure 11:
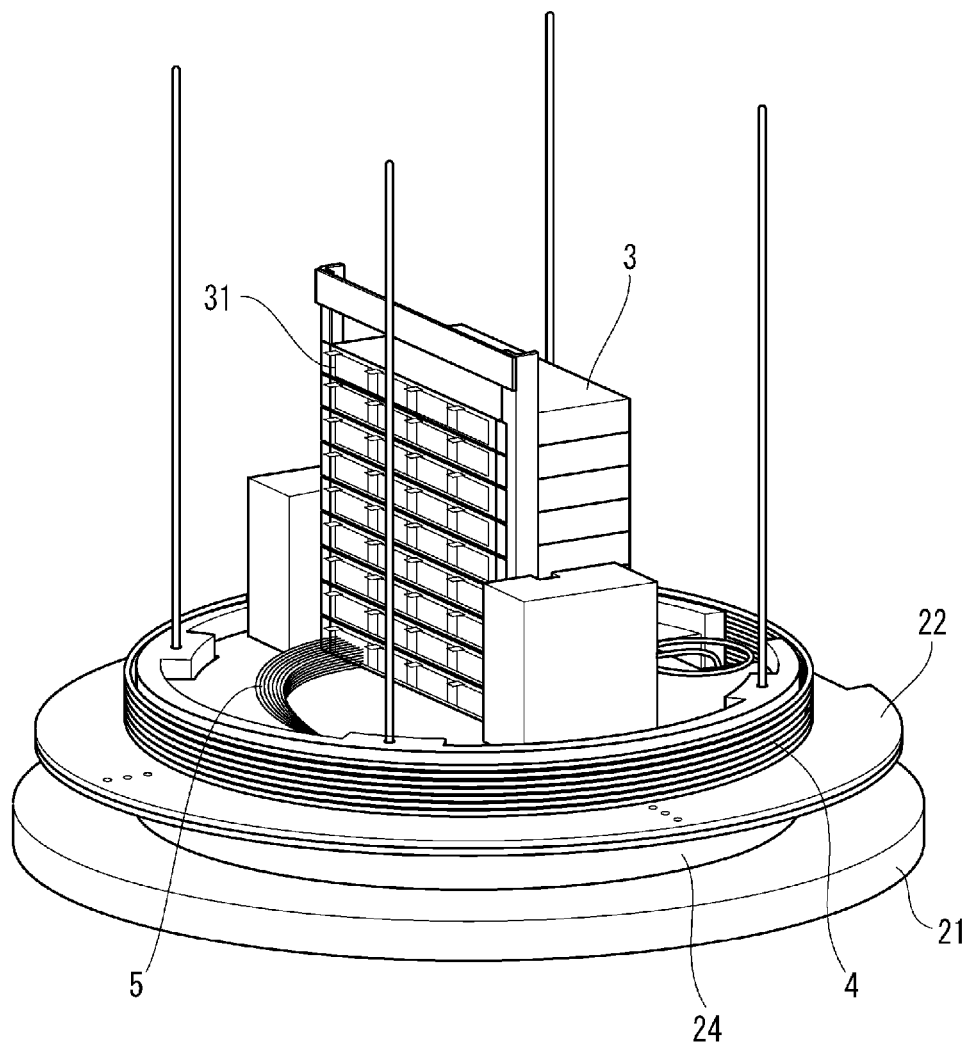
FIG. 11 is a diagram in which another optical cable is connected to the module.

Subsequently, one end of the bundle of the optical cable 4 is connected to the optical fiber connecting portion 321 formed on the rear surface 32 of the module 3 (STEP 5 in FIG. 6). Specifically, the one end of the optical cable 4 extending from the reel 22 is inserted through the opening region 243 from the outer side of the reel 22 and wired to the module 3. One end of the optical cable 4 is branched into four, the connector (not shown) is attached to tip ends of the branched cables 41, and the tip ends of the branched cables 41 are connected to the optical fiber connecting portions 321 via the connector. In a method of installing the wiring module 1 to be described later, since the bundle of the optical cable 4 is taken out from the upper side of the wiring module 1, it is preferable that the optical cable 4 is wired such that a surplus length exists between the module 3 and the reel 22. As shown in FIG. 11, another optical cable 5 is also connected to the optical fiber connecting portion 311 (see FIG. 4) formed on the front surface 31 of the module 3.

STEP 2 to STEP 5 are repeated until all of the plurality of reels 22 are stacked (NO in STEP 6 of FIG. 6). The reel 22 disposed on the upper surface 211 of the bottom plate 21 for the second time and thereafter is disposed so as to be stacked on the already stacked other reels 22.

Figure 12:
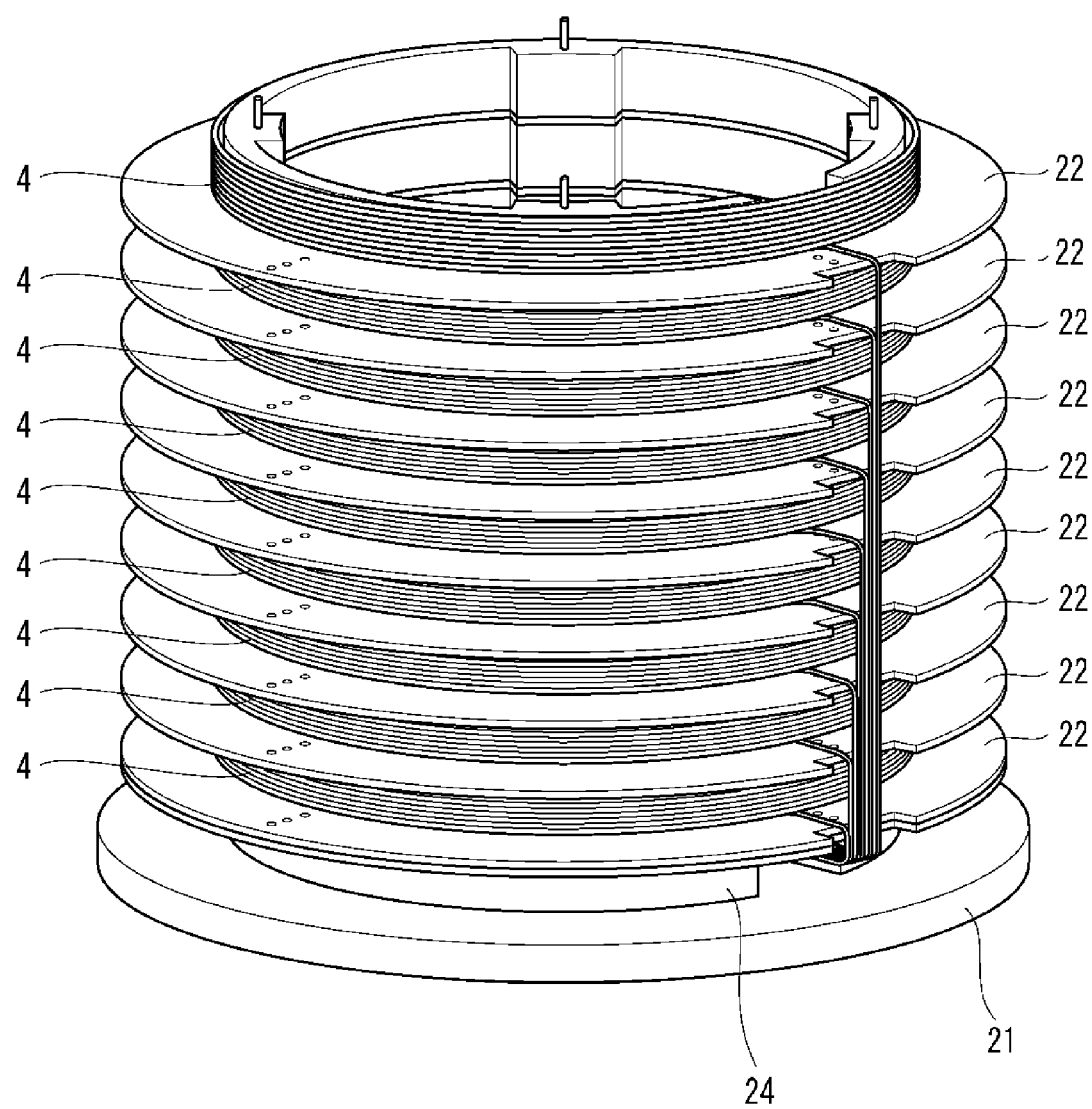
FIG. 12 is a diagram in which all reels are stacked.
Figure 13:
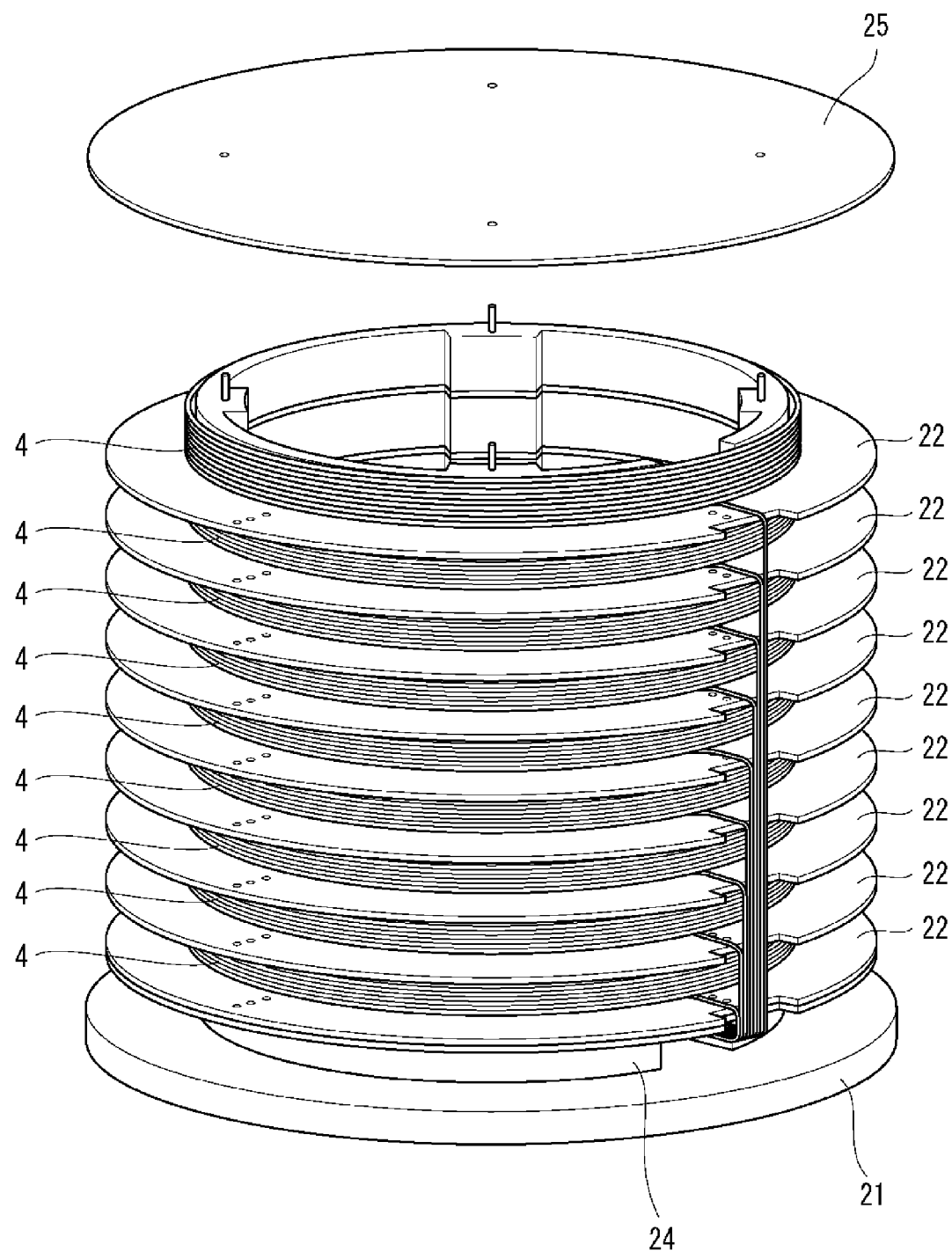
FIG. 13 is a diagram in which the upper lid is disposed.

As shown in FIG. 12, when all of the plurality of reels 22 are stacked (YES in STEP 6 of FIG. 6), as shown in FIG. 13, the upper lid 25 is attached on the uppermost reel 22, and the wiring module 1 is completed.

As described above, according to the forming method for forming the wiring module 1 of the present disclosure, since each optical cable 4 is accommodated in the corresponding reel 22, when the module 3 is connected to the other device, it is possible to prevent the optical cables 4 from being mixed or intertwined with each other. Further, since the plurality of reels 22 are stacked and the module 3 is disposed in the space S inside the stacked reels 22, the module 3 and the plurality of optical cables 4 can be collectively handled as one package. In addition, since the module 3 is disposed on the buffer material 23, it is possible to migrate the impact applied to the module 3 from the outside. Therefore, it is possible to improve the connection workability in the case where the module 3 is connected to the other device using the plurality of optical cables 4.

Further, since the optical cables 4 are connected to the optical fiber connecting portions 321 of the module 3, when the module 3 is connected to the other device, the work of connecting the optical cables 4 to the module 3 is not necessary, and the connection work time can be shortened.

Further, after the bundle of the optical cable 4 is accommodated in the reel 22, since the reel 22 in which the bundle of the optical cable 4 is accommodated is disposed on the upper surface 211 of the bottom plate 21, the accommodating work of the optical cables 4 to the reel 22 is easy. Here, instead of disposing the reel 22 in which the bundle of the optical cable 4 is accommodated on the upper surface 211 of the bottom plate 21, the bundle of the optical cable 4 may be accommodated in the reel 22 after the reel 22 is disposed on the upper surface 211 of the bottom plate 21.

(Installing Method for Installing Wiring Module 1)

Next, an installing method for installing the wiring module 1 will be described with reference to FIGS. 14 to 20. In this example, a case where the wiring module 1 is installed in a data center 100 shown in FIG. 20 will be described.

Figure 14:
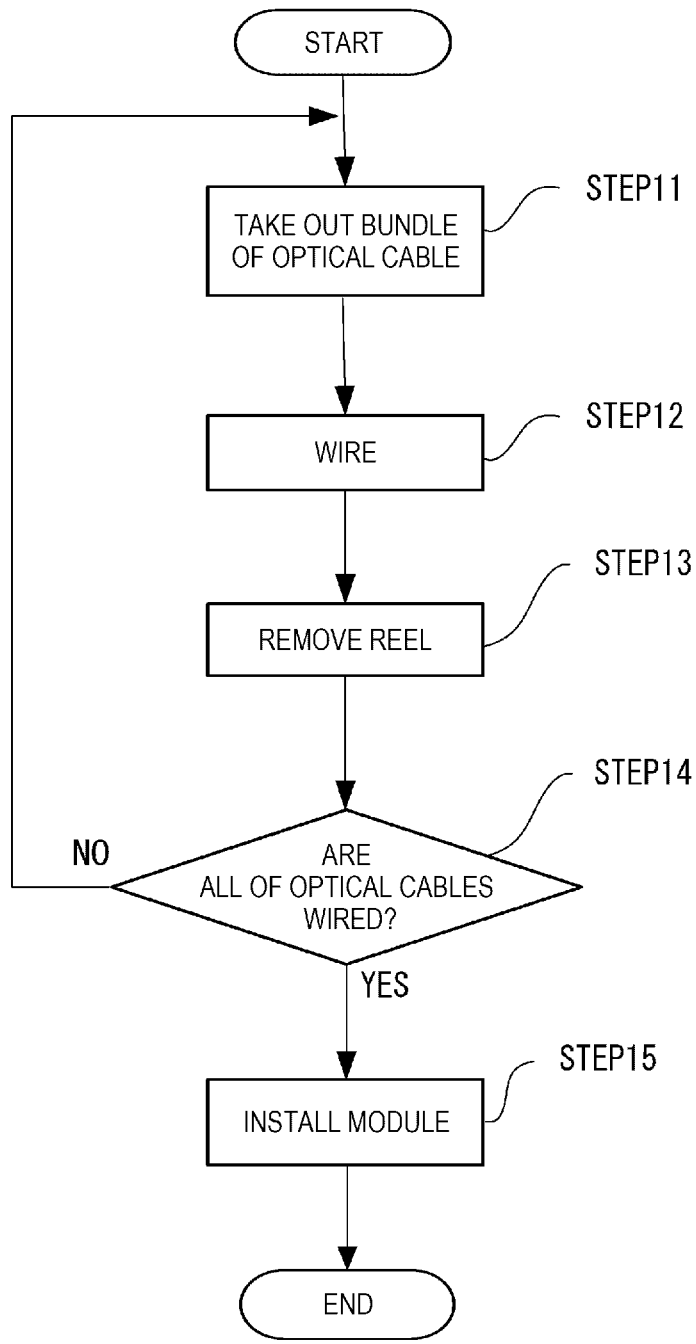
FIG. 14 shows a method for installing the wiring module.
Figure 15:
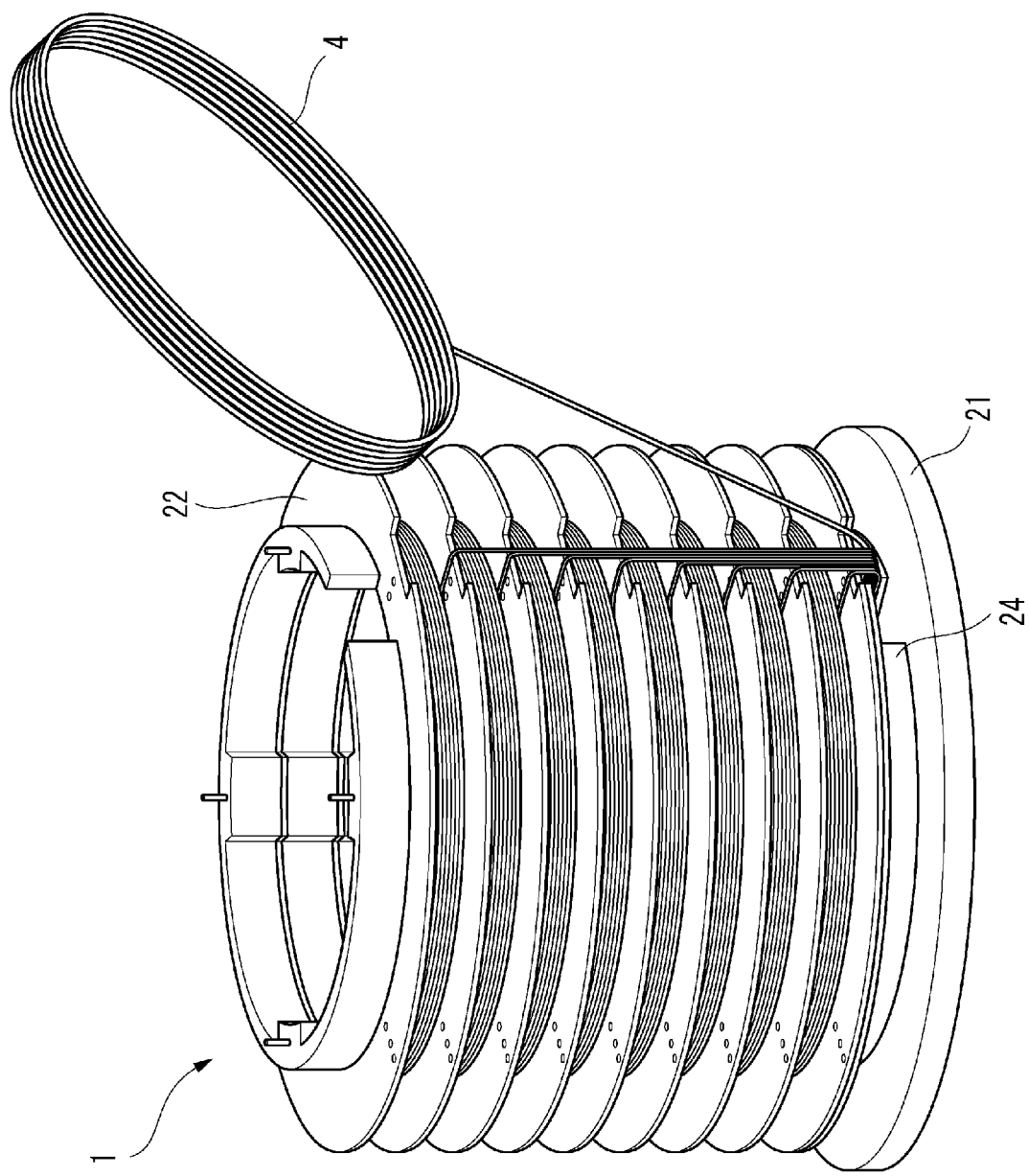
FIG. 15 is a diagram in which the bundle of the optical cable is taken out from the reel.

First, as shown in FIG. 15, the bundle of the optical cable 4 is taken out from the uppermost reel 22 of the plurality of stacked reels 22 (STEP 11 of FIG. 14). Specifically, the upper lid 25 is removed from the wiring module 1, and the bundle of the optical cable 4 accommodated in the uppermost reel 22 is taken out.

Figure 16:
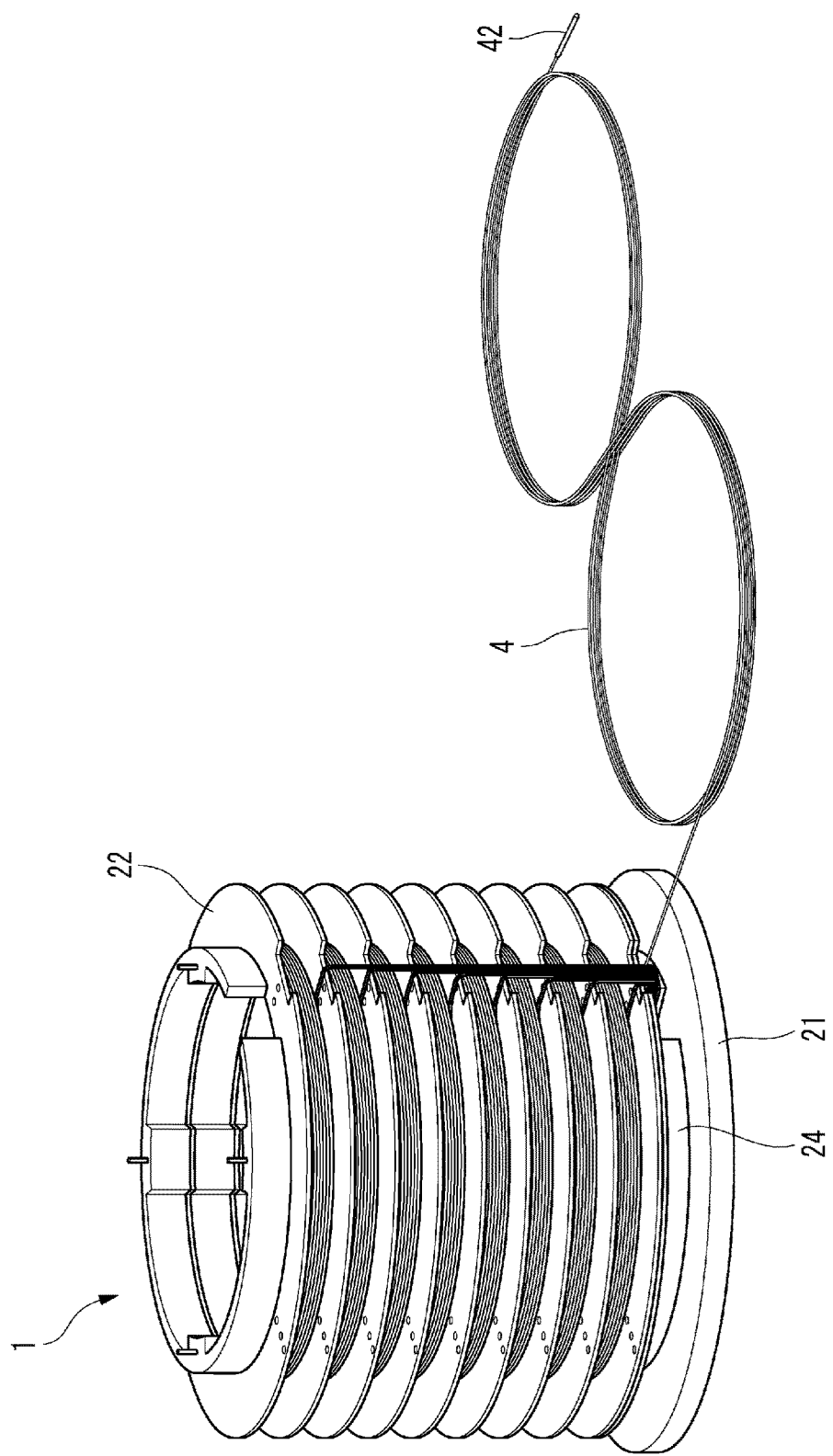
FIG. 16 is a diagram in which the optical cables are wired.

Subsequently, as shown in FIG. 16, the bundle of the optical cable 4 taken out from the reel 22 is released, and the optical cable 4 is wired (STEP 12 in FIG. 14). In this example, after the bundle of the optical cable 4 is opened to two and the optical cable 4 is put into a state where the optical cable 4 is wound in the shape of 8, the bundle of the optical cable 4 is released and the optical cable 4 is wired. A connector 42 is attached to the tip end of the optical cable 4, and the tip end of the optical cable is connected to a device disposed in a server rack 101 of the data center 100 shown in FIG. 20 via the connector 42.

Figure 17:
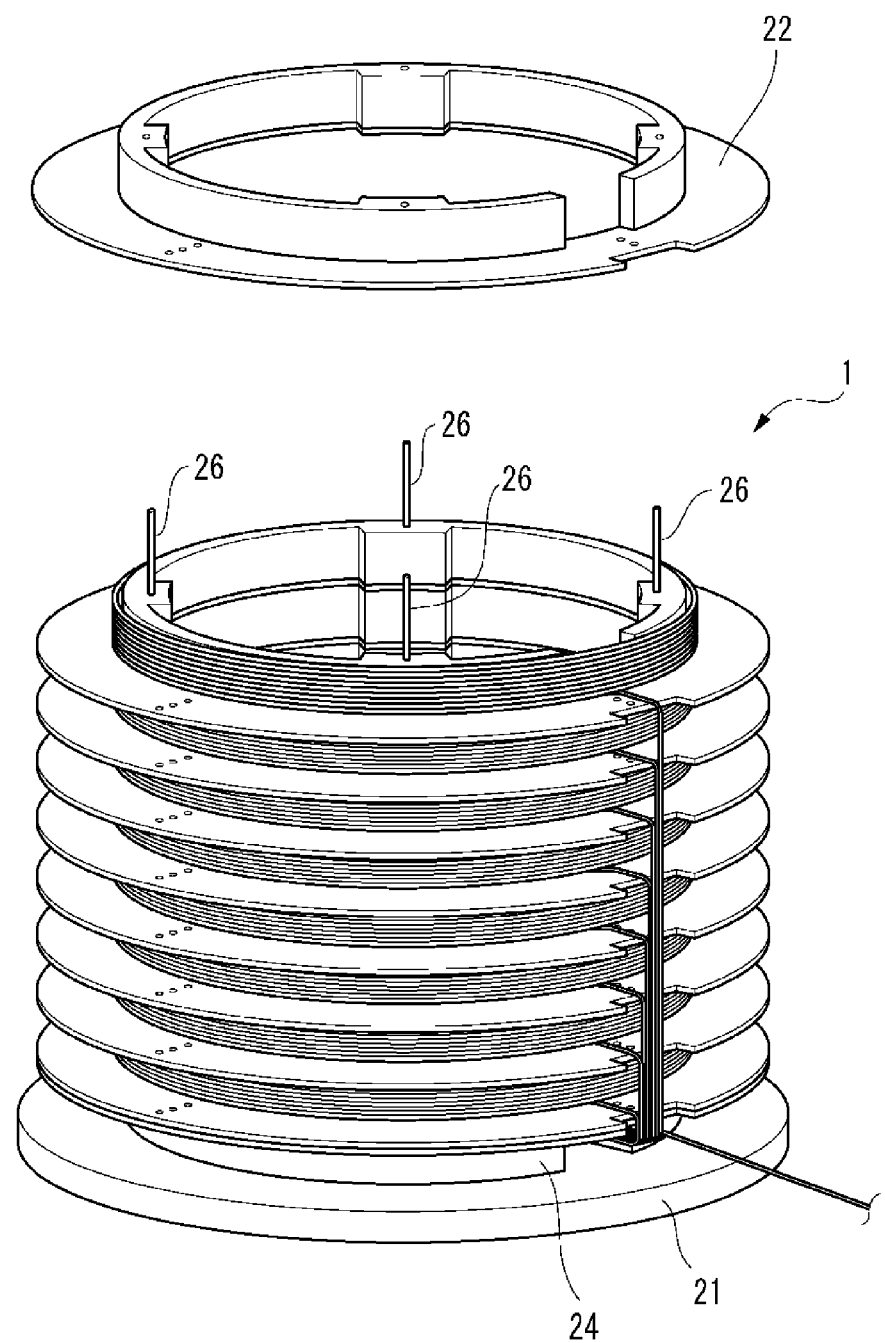
FIG. 17 is a diagram in which the reel is removed.

Subsequently, as shown in FIG. 17, the uppermost reel 22 of the plurality of stacked reels 22 is removed from the wiring module 1 (STEP 13 in FIG. 14). Specifically, the reel 22 is moved upward along the pillars 26 and taken out from the upper side of the wiring module 1.

Figure 18:
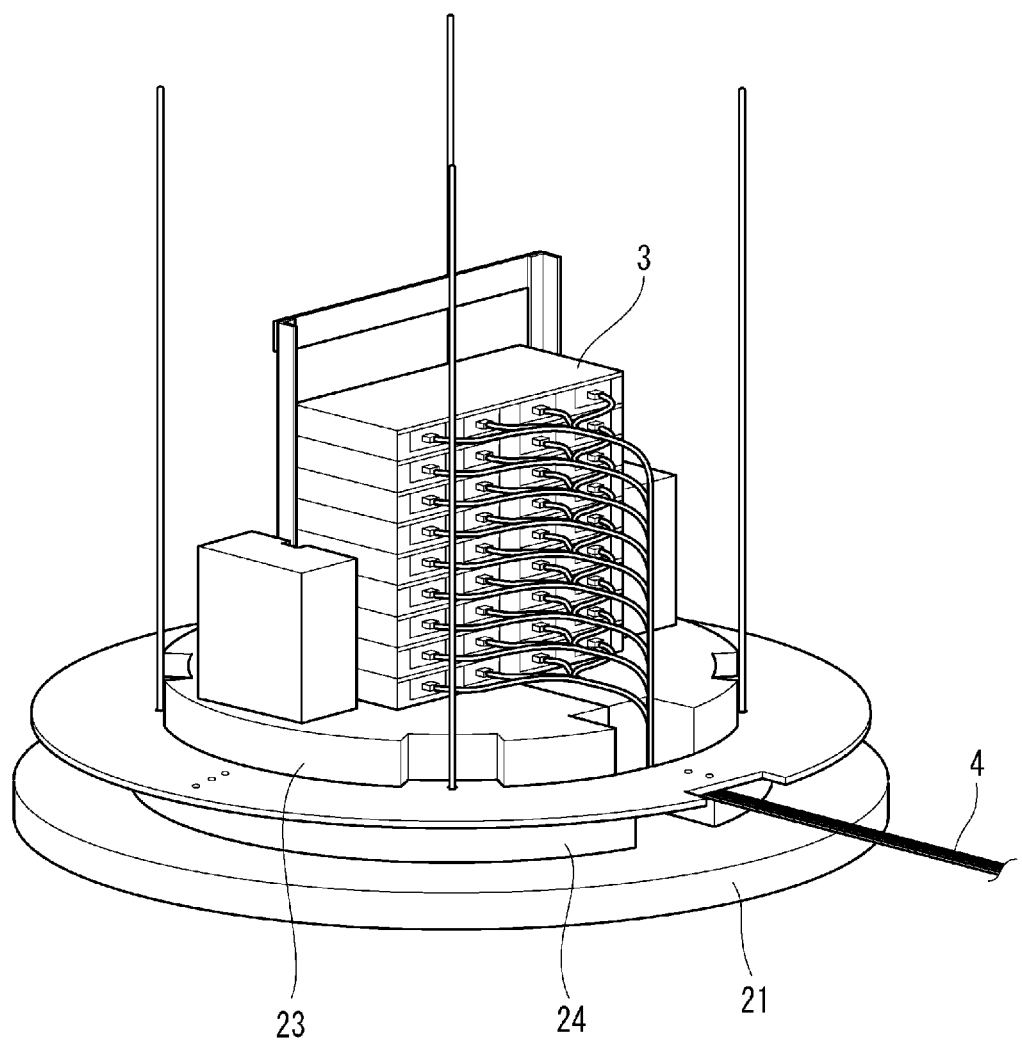
FIG. 18 is a diagram in which all of the optical cables are wired.
Figure 19:
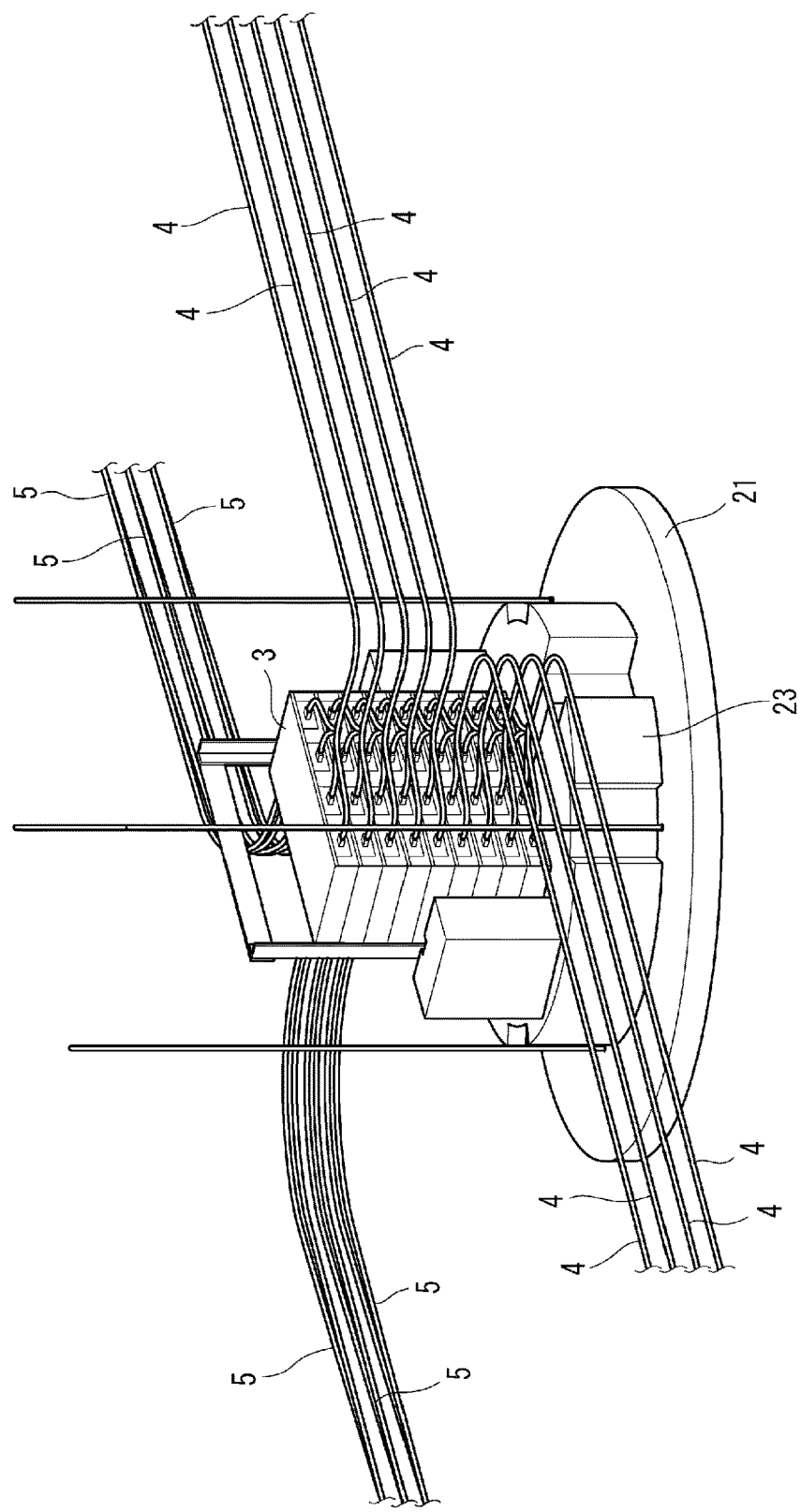
FIG. 19 is a diagram in which the spacer is removed.
Figure 20:
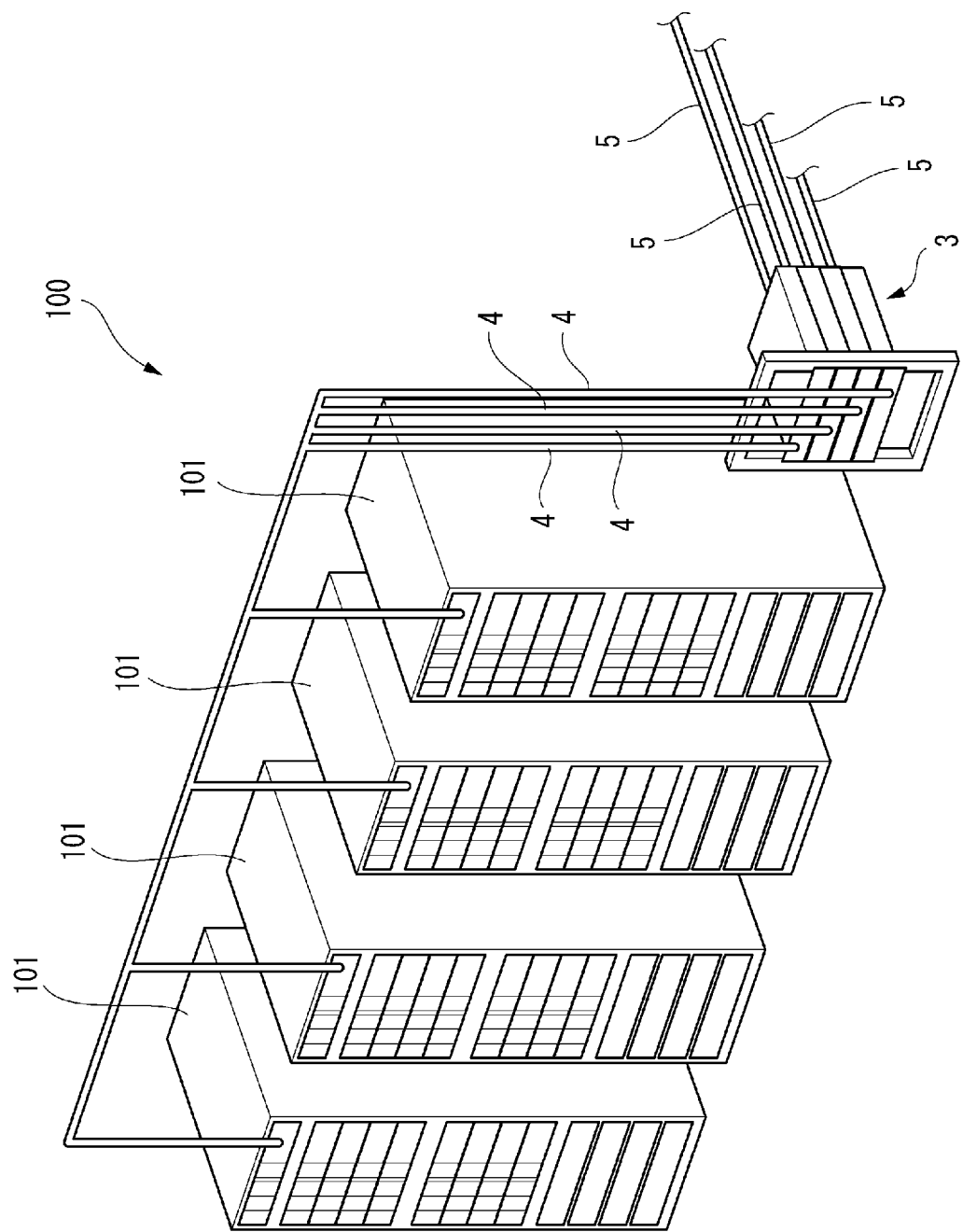
FIG. 20 is a diagram in which the module is installed in a data center.

STEPs 11 to 13 are repeated until all of the plurality of optical cables 4 are wired (NO in STEP 14 of FIG. 13). Then, as shown in FIG. 18, when all of the plurality of optical cables 4 are wired (YES in STEP 14 of FIG. 14), the module 3 is taken out from the wiring module 1 and installed in a predetermined place (STEP 15 of FIG. 14). Specifically, as shown in FIG. 19, after all of the optical cables 4 are wired, the spacer 24 is removed from the bottom plate 21. In addition, the other optical cable 5 connected to the optical fiber connecting portion 311 of the front surface 31 of the module 3 is wired. Then, the module 3 is taken out from the wiring module 1 and installed on a floor surface side by side with the server rack 101 as shown in FIG. 20, for example.

According to such an installation method, the work of connecting the optical cables 4 to the module is not necessary, and the connection work time can be shortened. Further, since each optical cable 4 is taken out from the corresponding reel 22 and wired, it is possible to prevent the optical cables 4 from being mixed or intertwined with each other. Therefore, it is possible to improve the connection workability in the case where the module 3 is installed using the plurality of optical cables 4.

In the installation method described above, after the bundle of the optical cable 4 is taken out from the reel 22, the bundle of the optical cable 4 is wired, and then the reel 22 is removed from the wiring module 1. However, after the bundle of the optical cable 4 is taken out from the reel 22, the reel 22 may be removed from the wiring module 1, and then the bundle of the optical cable 4 may be wired. Alternatively, after the reel 22 is removed from the wiring module 1 in the state in which the bundle of the optical cable 4 is accommodated, the bundle of the optical cable 4 may be taken out from the reel 22.

Although the present disclosure has been described in detail with reference to a specific embodiment, it will be apparent to those skilled in the art that various changes and modifications can be made without departing from the spirit and scope of the present disclosure. The numbers, positions, shapes and the like of components described above are not limited to the above embodiment and can be changed to suitable numbers, positions, shapes and the like on a premise that the present disclosure is carried out.

Figure 21:
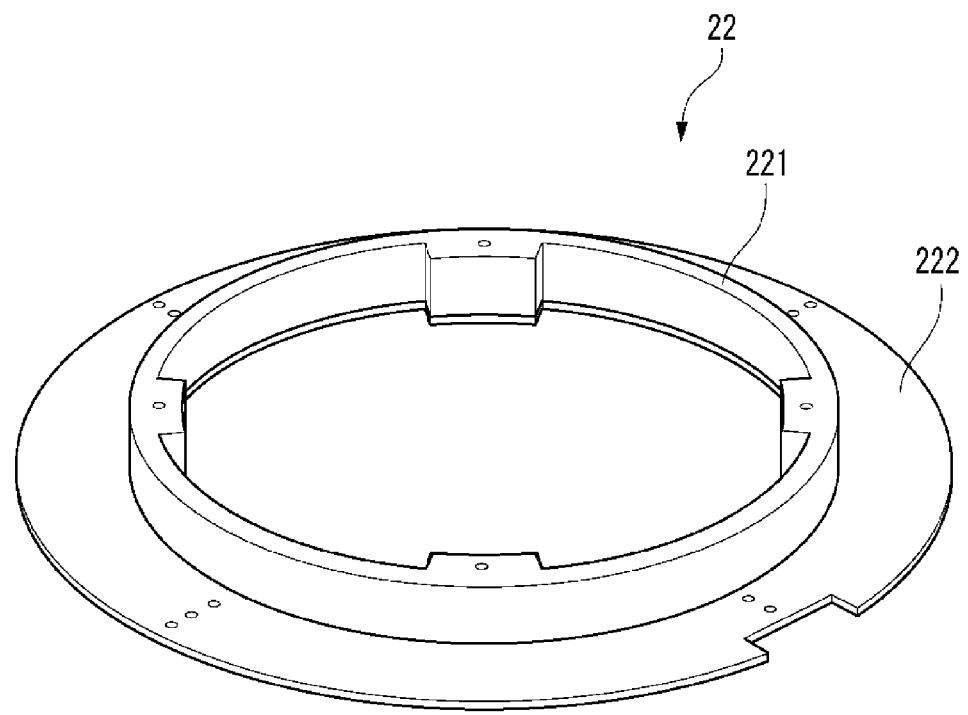
FIG. 21 is a diagram showing a modification of the reel.
Figure 22:
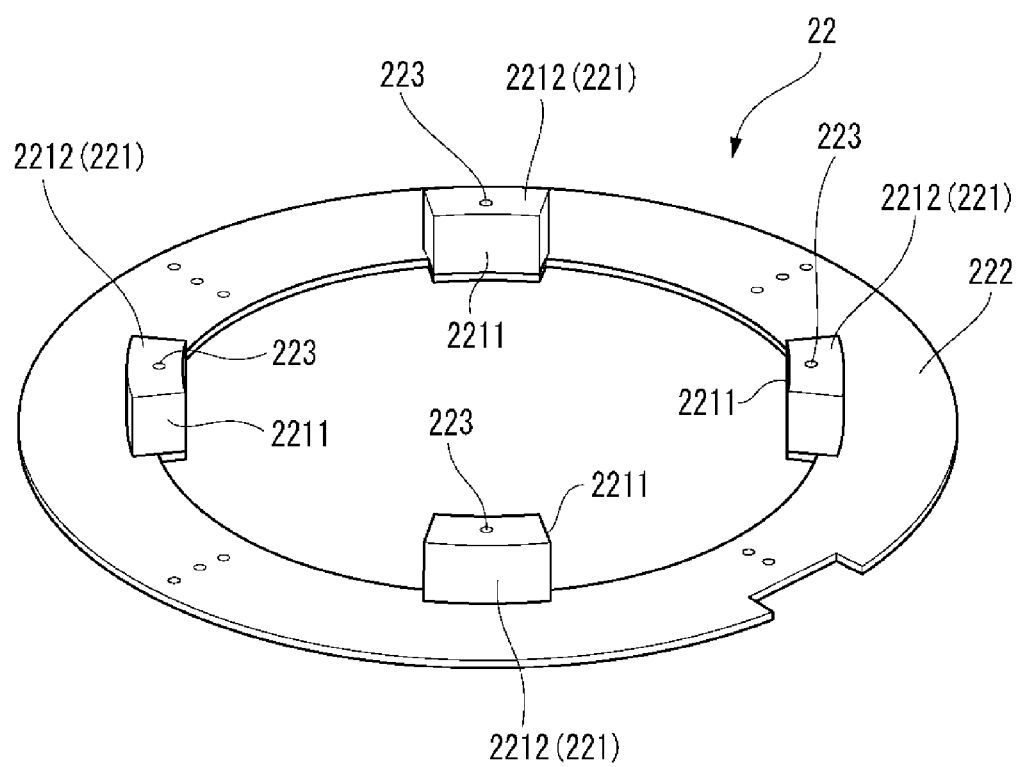
FIG. 22 is a diagram showing a modification of the reel.

In the above embodiment, the body portion 221 of the reel 22 has a C shape when viewed from the stacking direction of the reels 22. However, the body portion 221 of the reel 22 may have another shape as long as the bundle of the optical cable 4 can be prevented from entering the inner side of the body portion 221. For example, as shown in FIG. 21, the body portion 221 of the reel 22 may have a ring shape when viewed from the stacking direction of the reels 22. Alternatively, as shown in FIG. 22, the body portion 221 of the reel 22 may be formed by a plurality of portions 2212 spaced apart from each other along the shape of the bundle of the optical cable 4. In this example, the body portion 221 of the reel 22 is formed by four portions 2212 in which the holes 223 and the convex portions 2211 are formed.

In the above embodiment, the flange portion 222 of the reel 22 is provided at one end of the body portion 221 of the reel 22 in the extending direction of the body portion 221. However, the flange portion 222 of the reel 22 may be formed at a position close to the one end of the body portion 221 of the reel 22 in the extending direction of the body portion 221. For example, the bundle of the optical cable 4 may be accommodated in a portion on an upper side in the stacking direction of the reel 22 with respect to the flange portion 222 of the body portion 221, and a portion on a lower side in the stacking direction of the reel 22 with respect to the flange portion 222 of the body portion 22 may be used as a spacer with respect to the lower reel 22.

Figure 23:
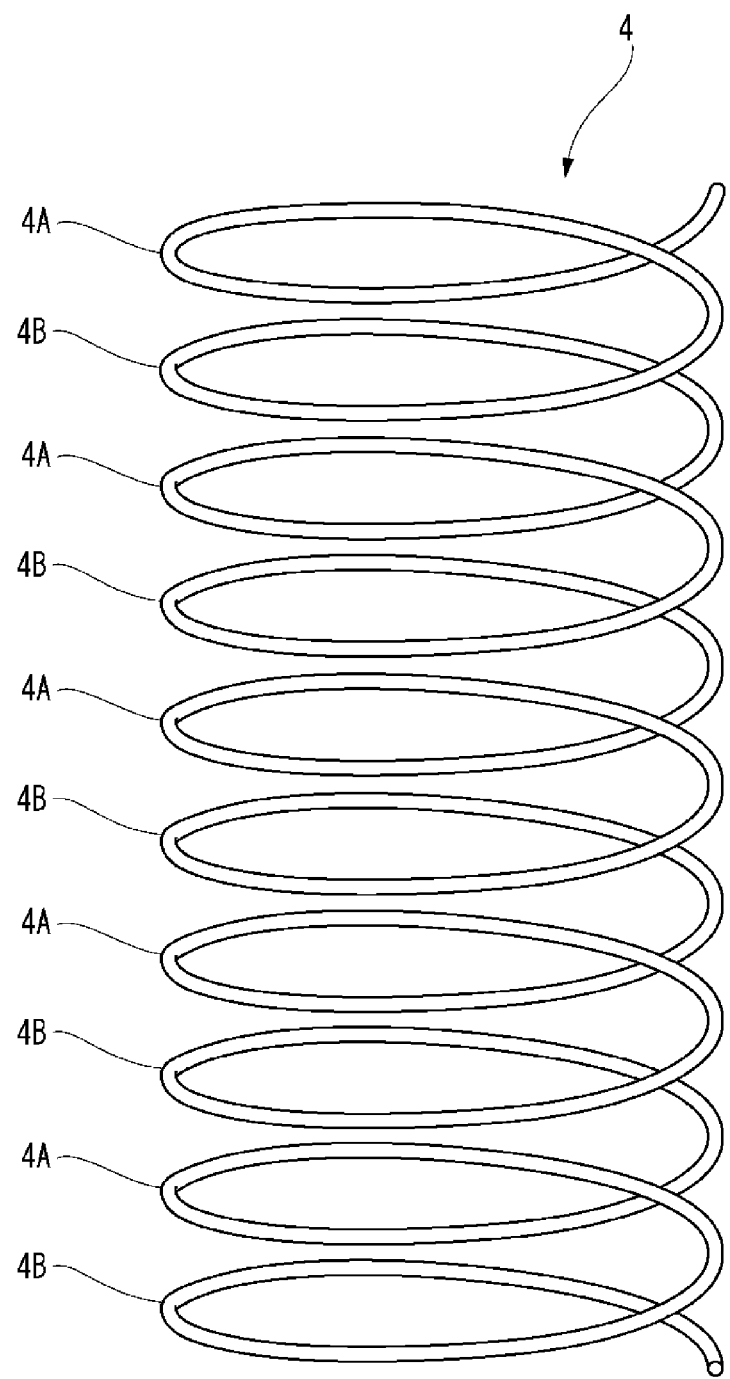
FIG. 23 is a diagram showing a modification of the bundle of the optical cable.

In the above embodiment, the optical cable 4 is formed in the bundle in which the optical cable wound in the shape of 8 is folded back. However, as shown in FIG. 23, the optical cable 4 may be formed in a bundle in which the optical fiber is wound by reversed phase winding. The bundle of reversed phase winding can be formed by repeating a step of forming a loop 4A by twisting the optical cable 4 in a clockwise direction and then forming a loop 4B by twisting the optical fiber cable 4 in a counterclockwise direction, thereby forming the loops into a bundle. Even in this case, when the bundle of the optical cable 4 is taken out from the reel 22 and the optical cables 4 are wired, it is possible to prevent the optical cable 4 from being twisted. Therefore, the wiring work of the optical cables 4 is improved.

Figure 24:
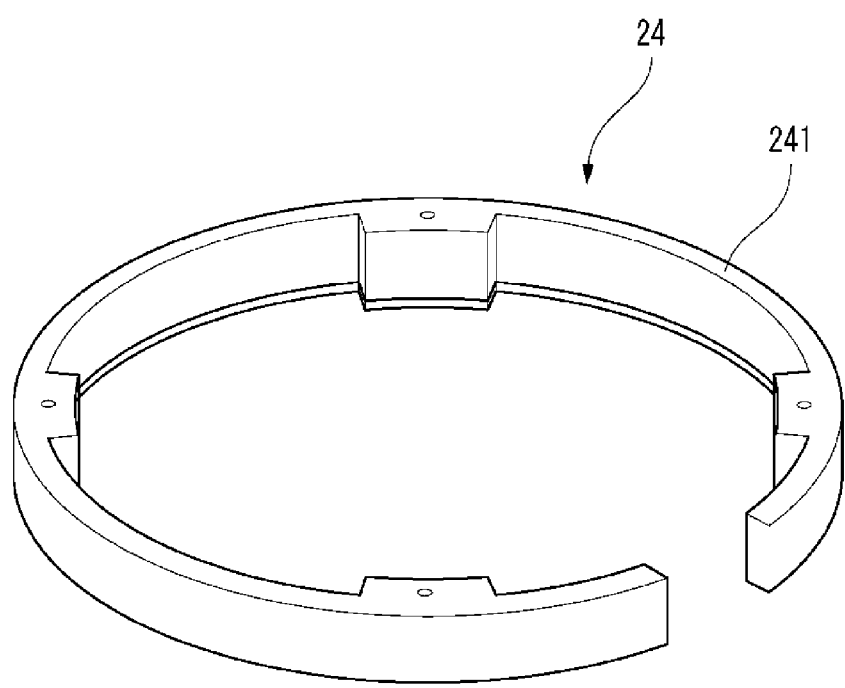
FIG. 24 is a diagram showing a modification of the spacer.

In the above embodiment, similarly to the reel 22, the spacer 24 includes the body portion 241 and the flange portion 242. However, for example, as shown in FIG. 24, the spacer 24 may be formed only of the body portion 241. In this case, in STEP 15 (module installation process) of FIG. 14, work of removing the spacer 24 from the bottom plate 21 can be omitted.

In the above embodiment, the optical cable 4 is connected to the optical fiber connecting portion 321 formed on the rear surface 32 of the module 3. However, the optical cable 4 may be connected to the optical fiber connecting portions 311 formed on the front surface 31 of the module 3 instead of or in addition to the optical fiber connecting portion 321. Alternatively, the optical cable 4 may be wired inside the module 3 through the front surface 31 and the rear surface 32, and may be directly connected to the optical fiber connecting portions 311, the optical fiber connecting portion 321, or the wiring cord 3311 (FIG. 4).

In the above embodiment, the module 3 includes the optical fiber connecting portions 311 and 321 on both the front surface 31 and the rear surface 32. However, the module may include the optical fiber connecting portion on either of the front surface 31 or the rear surface 32.

In the above embodiment, the optical fiber connecting portion 311 is the single-core adapter, and the optical fiber connecting portion 321 is the multi-core adapter. However, for example, the optical fiber connecting portion 311 may be the multi-core adapter, and the optical fiber connecting portion 321 may be the single-core adaptor. Alternatively, both the optical fiber connecting portion 311 and the optical fiber connecting portion 321 may be the multi-core adapter or may be the single-core adapter. Further, in at least one of the front surface 31 and the rear surface 32, the multi-core adapter and the single-core adapter may be mixed as the optical fiber connecting portions 311 and 321.

The module 3 may have a plate shape in which the front surface 31 and the rear surface 32 are integrated, and the optical fiber connecting portion 311 may be provided on one surface and the optical fiber connecting portion 321 may be provided on the other surface.

In the above embodiment, the buffer material 23 is disposed on the upper surface 211 of the bottom plate 21 in the state of being in contact with the upper surface 211 of the bottom plate 21. However, the buffer material 23 may be disposed on the upper surface 211 of the bottom plate 21 in a state of not being in contact with the upper surface 211 of the bottom plate 21. For example, the buffer material 23 may be disposed on the spacer 24 disposed on the upper surface 211 of the bottom plate 21. In this case, the spacer 24 is formed so as to have a form in which the buffer material 23 can be placed.

In the above embodiment, the body portion 221 of the reel 22 includes the convex portion 2211, and the buffer material 23 includes the concave portion 232. However, the buffer material 23 may include a convex portion, and the body portion 221 of the reel 22 may include a concave portion.

In the above embodiment, the opening region 243 communicating with the space S is formed by the body portion 241 and the flange portion 242 of the spacer 24 and the bottom plate 21. However, the opening region 243 may be formed by providing a through hole in the spacer 24 itself. Alternatively, in a case where the spacer 24 includes only the body portion 241 shown in FIG. 24, the opening region 243 may be formed by the body portion 241 of the spacer 24, the bottom plate 21, and the flange portion 222 of the reel 22A closest to the bottom plate 21.

In the above embodiment, the flange portion 222 is adhered to the body portion 221. However, the flange portion 222 may not be adhered to the body portion 221. In a case where the flange portion 222 is not adhered to the body portion 221, a length of the body portion 221 in the stacking direction of the reel 22 of the body portion 221 can be changed by stacking the body portion 221 according to a size of the accommodated bundle of the optical cable 4.

In the above embodiment, the optical cable 4 including the plurality of optical fiber core wires is exemplified as an example of the optical fiber. However, the optical fiber may be, for example, the optical fiber cord in which the periphery of one optical fiber core wire or the aggregate of the plurality of optical fiber core wires is covered with the outer cover. Further, although the optical cable 4 is branched into the plurality of branch cables 41 and connected to the plurality of optical fiber connecting portions 321, the optical cable 4 may be connected to the optical fiber connecting portion 321 without being branched.

(Appendix)

For example, the present disclosure includes the following embodiments.

An installing method for installing a module from a wiring module, the wiring module including: a bottom plate; the module having two surfaces facing each other; a plurality of optical fibers, each of which is connected to the module via at least one of the surfaces of the module; and a plurality of reels sequentially stacked on an upper surface of the bottom plate, each of the plurality of reels accommodating a bundle of one corresponding optical fiber among the plurality of optical fibers, and the module being disposed in a space formed inside the plurality of reels which are stacked, the installing method comprising:
    an optical fiber bundle taking-out step of taking out the bundle of the optical fiber from an uppermost reel of the plurality of reels which are stacked;
    a reel removing step of removing the uppermost reel of the plurality of reels which are stacked from the wiring module;
    a wiring step of wiring the optical fiber by releasing the bundle of the optical fiber taken out from the reel; and
    a step of taking out the module from the wiring module and installing the module, in which the optical fiber bundle taking-out step, the reel removing step, and the wiring step are repeated until all of the plurality of optical fibers are wired.

REFERENCE SIGNS LIST

1: wiring module
2: frame body
21: bottom plate
211: upper surface
22: reel
221: body portion
2211: convex portion
2212: portion
222: flange portion
2221: notch
2222: fixing hole
223: hole
23: buffer material
231: concave portion
232: concave portion
24: spacer
241: body portion
242: flange portion
243: opening region
244: hole
25: upper lid
26: pillar
3: module
31: front surface
311: optical fiber connecting portion
32: rear surface
321: optical fiber connecting portion
33: device module
331: branch box
3311: wiring cord
3312: multi-core connector
3313: single-core connector
4: optical cable
41: branch cable
42: connector
4A: twisting wheel in clockwise direction
4B: twisting wheel in counterclockwise direction
5: optical cable
100: data center
101: server rack
A: stacking direction
D1: diameter
D2: diameter
S: space

The invention claimed is:

1. A wiring module comprising:
a bottom plate;
a module having two surfaces facing each other;
a plurality of optical fibers, each of which is connected to the module via at least one of the surfaces of the module;
a plurality of reels which are sequentially stacked on an upper surface of the bottom plate, each of the plurality of reels accommodating a bundle of one corresponding optical fiber among the plurality of optical fibers, wherein the module is disposed in a space formed inside the plurality of reels which are stacked, and
wherein the reel includes a body portion extending in a stacking direction of the plurality of reels, and a flange portion formed at a position close to one end of the body portion in an extending direction of the body portion and extending toward an outer side of the body portion in a direction intersecting the extending direction; and a plurality of pillars extending in the stacking direction of the plurality of reels and spaced apart from each other in a direction intersecting the stacking direction, wherein a plurality of holes are formed in the body portion of the reel, a corresponding pillar being inserted into each of the plurality of holes.

2. The wiring module according to claim 1, wherein a notch is provided in the flange portion of each real of the plurality of reels.

3. The wiring module according to claim 1, further comprising:

a spacer disposed between the bottom plate and a reel closest to the bottom plate of the plurality of reels, wherein an opening region communicating with the space is formed between the bottom plate and the reel closest to the bottom plate of the plurality of reels.

4. The wiring module according to claim 1, wherein at least one surface of the surfaces of the module facing each other includes an optical fiber connecting portion.

5. The wiring module according to claim 4, wherein both of the two surfaces of the module facing each other include the optical fiber connecting portion.

6. The wiring module according to claim 1, wherein a winding diameter of the bundle of the optical fiber is larger than a diameter of the body portion of each reel of the plurality of reels.

7. The wiring module according to claim 6, wherein the optical fiber is accommodated in a periphery of the body portion of the reel in a state of a bundle in which the optical fiber wound in a shape of 8 is folded back.

8. The wiring module according to claim 6, wherein the optical fiber is accommodated in a periphery of the body portion of the reel in a state of a bundle in which the optical fiber is wound by reversed phase winding.

9. The wiring module according to claim 1, further comprising:

a buffer material on which the module is placed, wherein the buffer material is disposed in the space formed inside the plurality of reels which are stacked.

10. The wiring module according to claim 9, wherein the buffer material includes a plurality of concave portions or convex portions that are fitted to a part of the body portion of each reel of the plurality of reels.

11. A frame body for a wiring module, the frame body comprising:

a bottom plate;

a plurality of reels which are sequentially stacked on an upper surface of the bottom plate, each of the plurality of reels being capable of accommodating an optical fiber; and a buffer material on which a module is to be placed, wherein the buffer material is disposed in a space formed inside the plurality of reels which are stacked, and wherein the reel includes a body portion extending in a stacking direction of the plurality of reels, and a flange portion formed at a position close to one end of the body portion in an extending direction of the body portion and extending toward an outer side of the body portion in a direction intersecting the extending direction; and a plurality of pillars extending in the stacking direction of the plurality of reels and spaced apart from each other in a direction intersecting the stacking direction, wherein a plurality of holes are formed in the body portion of the reel, a corresponding pillar being inserted into each of the plurality of holes.

12. The frame body for a wiring module according to claim 11, wherein a notch is provided in the flange portion of each reel of the plurality of reels.

13. The frame body for a wiring module according to claim 11, further comprising:

a spacer disposed between the bottom plate and a reel closest to the bottom plate of the plurality of reels, wherein an opening region communicating with the space is formed between the bottom plate and the reel closest to the bottom plate of the plurality of reels.

14. The frame body for a wiring module according to claim 11, wherein the buffer material includes a plurality of concave portions or convex portions that are fitted to a part of the body portion of each reel of the plurality of reels.

15. A forming method for forming a wiring module including a bottom plate, a buffer material, a module having two surfaces facing each other, a plurality of optical fibers, and a plurality of reels, the forming method comprising:

a step of disposing the buffer material on an upper surface of the bottom plate and disposing the module on the buffer material;

an optical fiber bundle forming step of forming one optical fiber of the plurality of optical fibers into a bundle;

an optical fiber bundle accommodating step of accommodating the bundle of the optical fiber in one reel of the plurality of reels; and a reel disposition step of stacking the one reel of the plurality of reels on the upper surface of the bottom plate such that the module is disposed inside the reel, wherein the optical fiber bundle forming step, the optical fiber bundle accommodating step, and the reel disposition step are repeatedly performed until all of the plurality of reels are stacked, and wherein in the reel disposition step performed for a second time and thereafter, the reel is disposed so as to be stacked on another reel that is already stacked on the upper surface of the bottom plate, and wherein the reel includes a body portion extending in a stacking direction of the plurality of reels, and a flange portion formed at a position close to one end of the body portion in an extending direction of the body portion and extending toward an outer side of the body portion in a direction intersecting the extending direction; and an extending step of extending a plurality of pillars in the stacking direction of the plurality of reels, the plurality of pillars being spaced apart from each other in a direction intersecting the stacking direction, wherein a plurality of holes are formed in the body portion of the reel, a corresponding pillar being inserted into each of the plurality of holes.

16. The forming method for forming a wiring module according to claim 15, wherein after the optical fiber bundle forming step and the optical fiber bundle accommodating step are performed, in the reel disposition step, a real, of the plurality of reels, in which the bundle of the optical fiber is accommodated is disposed on the upper surface of the bottom plate.

17. The forming method for forming a wiring module according to claim 15,
wherein the module includes an optical fiber connecting portion on at least one surface of the surfaces facing each other, and
wherein the forming method further comprises a connection step of connecting one end of the bundle of the optical fiber to the optical fiber connecting portion of the module after the reel disposition step is performed.

* * * * *